(12) United States Patent
Morgan

(10) Patent No.: US 9,315,346 B2
(45) Date of Patent: Apr. 19, 2016

(54) ROTATING PLATFORM ACCELERATION SYSTEM AND METHOD

(71) Applicant: Robert W. Morgan, Aiken, SC (US)

(72) Inventor: Robert W. Morgan, Aiken, SC (US)

(73) Assignee: RWM Technologies, LLC, Aiken, SC (US)

( * ) Notice: Subject to any disclaimer, the term of this patent is extended or adjusted under 35 U.S.C. 154(b) by 0 days.

(21) Appl. No.: 14/680,585

(22) Filed: Apr. 7, 2015

(65) Prior Publication Data

US 2015/0210486 A1    Jul. 30, 2015

Related U.S. Application Data

(63) Continuation of application No. 14/335,433, filed on Jul. 18, 2014, now Pat. No. 9,010,518.

(60) Provisional application No. 61/856,642, filed on Jul. 19, 2013, provisional application No. 61/867,637, filed on Aug. 20, 2013.

(51) Int. Cl.
| | |
|---|---|
| B66B 21/02 | (2006.01) |
| B65G 37/00 | (2006.01) |
| B66B 21/10 | (2006.01) |
| B65G 67/22 | (2006.01) |
| B66B 21/00 | (2006.01) |
| B65G 29/00 | (2006.01) |
| B65G 47/68 | (2006.01) |

(52) U.S. Cl.
CPC ............... *B65G 67/22* (2013.01); *B65G 29/00* (2013.01); *B65G 37/00* (2013.01); *B66B 21/00* (2013.01); *B66B 21/02* (2013.01); *B66B 21/10* (2013.01); *B65G 47/68* (2013.01)

(58) Field of Classification Search
CPC ........ B66B 21/02; B66B 21/10; B65G 29/00; B65G 37/00
USPC ............ 198/392, 459.2, 461.1; 414/334, 340, 414/353
See application file for complete search history.

(56) References Cited

U.S. PATENT DOCUMENTS

| | | | | | |
|---|---|---|---|---|---|
| 3,224,554 | A | * | 12/1965 | Moulder et al. | 198/392 |
| 3,392,816 | A | * | 7/1968 | Cox | 198/380 |
| 3,396,509 | A | * | 8/1968 | Hotger | 53/258 |
| 3,482,529 | A | | 12/1969 | Paul | |
| 3,727,558 | A | * | 4/1973 | Winkle | B66B 29/08 104/21 |
| 3,865,041 | A | * | 2/1975 | Bacon | 104/20 |
| 4,150,520 | A | * | 4/1979 | Palmieri et al. | 53/225 |
| 4,369,875 | A | * | 1/1983 | Schmitz | 198/456 |
| 4,543,886 | A | * | 10/1985 | Spieldiener et al. | 104/53 |

(Continued)

*Primary Examiner* — Douglas Hess
(74) *Attorney, Agent, or Firm* — Anderson & Levine, LLP

(57) ABSTRACT

A method of accelerating an item with a rotating platform. The rotating platform has a center point, a perimeter, and a radius from the center point to the perimeter. The method delivers the item to a center area of the rotating platform by delivering the item to a first radial distance on the rotating platform; the item has a first speed at the center area and tangential to the first radial distance. Also, while the rotating platform is rotating, the method moves the item, in an apparatus-controlled orderly path, from the center area to a point relative to the rotating platform that is adjacent a perimeter of the rotating platform and that is located at a second radial distance greater than the first radial distance; the item has a second speed tangential to the second radial distance and the second speed is greater than the first speed. Finally, while the rotating platform is rotating, the method moves the item, from the point, to a location beyond the perimeter of the rotating platform.

28 Claims, 16 Drawing Sheets

(56) References Cited

U.S. PATENT DOCUMENTS

| | | | |
|---|---|---|---|
| 4,643,628 A * | 2/1987 | Pini | 414/279 |
| 4,941,794 A * | 7/1990 | Hara et al. | 414/341 |
| 4,964,496 A | 10/1990 | Dexter, Jr. et al. | |
| 5,033,392 A * | 7/1991 | Schemitsch | 104/35 |
| 5,044,487 A * | 9/1991 | Spatafora et al. | 198/392 |
| 5,065,852 A * | 11/1991 | Marti | 198/392 |
| 5,213,048 A | 5/1993 | Kunczynski | |
| 5,372,236 A * | 12/1994 | Layer | 198/392 |
| 5,443,149 A * | 8/1995 | Rohwetter et al. | 198/392 |
| 5,558,198 A | 9/1996 | Juarez | |
| 5,746,323 A * | 5/1998 | Dragotta | 209/539 |
| 5,772,006 A * | 6/1998 | Axmann | 198/831 |
| 5,863,177 A * | 1/1999 | Carson et al. | 414/798.9 |
| 5,954,184 A * | 9/1999 | Schmitt | 198/392 |
| 6,302,258 B1 * | 10/2001 | Verona | 198/392 |
| 6,368,042 B1 * | 4/2002 | Gagnon et al. | 414/392 |
| 7,370,086 B2 * | 5/2008 | Kroeker et al. | 709/217 |
| 7,383,937 B2 * | 6/2008 | Perreault et al. | 198/392 |
| 7,784,405 B2 * | 8/2010 | Rose et al. | 104/20 |
| 9,010,518 B2 * | 4/2015 | Morgan | 198/392 |
| 2010/0326791 A1 | 12/2010 | Gonzalez et al. | |

\* cited by examiner

ROTATING PLATFORM ACCELERATION SYSTEM AND METHOD

CROSS-REFERENCES TO RELATED APPLICATIONS

This application claims priority, and the benefit of the filing date, under 35 U.S.C. §120 of U.S. patent application Ser. No. 14/335,433, filed Jul. 18, 2014, and which is hereby incorporated herein by reference. Said U.S. patent application Ser. No. 14/335,433 claims priority, and the benefit of the filing date, under 35 U.S.C. §119 of: (1) U.S. Provisional Application No. 61/856,642, filed Jul. 19, 2013; and (2) U.S. Provisional Application No. 61/867,637, filed Aug. 20, 2013, both of which are hereby incorporated herein by reference.

STATEMENT REGARDING FEDERALLY SPONSORED RESEARCH OR DEVELOPMENT

Not Applicable.

BACKGROUND OF THE INVENTION

The preferred embodiments relate to mass transit of compartments for goods and people and more particularly facilitate delivery and withdrawal of such compartments with respect to mass transit vehicles, such as railway systems.

The use of railway systems in mass transit has a long history and continues to evolve, with certain considerations for whether the transit is of goods or passengers. Railway transit has numerous benefits, including reliability, safety, speed, flexibility, limited ground consumption for rail lines, and the proven ability to transport millions of tons of goods and people in a wide variety of regions.

The present inventor has recognized, however, that preferred embodiments may facilitate a profound improvement in mass transit, such as in railway systems. Particularly, the preferred embodiments implement a system that permits controlled, systematic, and efficient delivery and withdrawal of compartments, for either goods or passengers, into a railway system by way of example. The preferred embodiment system may vastly reduce energy needs of existing railway systems in that the compartment movement may be achieved by allowing the railcars to continue to move at either an existing or reduced speed, but in any event without requiring the railcars in the railway system to come to a stop. As a result, considerable savings are anticipated in energy and other resources, where such savings otherwise are diminished or lost in current railway systems that are with some frequency required to stop, so as to load goods or passengers to/from the railway cars. Further, the preferred embodiment system may profoundly affect the manner in which persons or goods are distributed to and from the railway, so as also to provide greater efficiencies in travel and scheduling.

Still other benefits will be appreciated by one skilled in the art, given an understanding of the discussion below.

BRIEF SUMMARY OF THE INVENTION

In one preferred embodiment, there is a method of accelerating an item with a rotating platform. The rotating platform has a center point, a perimeter, and a radius from the center point to the perimeter. The method delivers the item to a center area of the rotating platform by delivering the item to a first radial distance on the rotating platform; the item has a first speed at the center area and tangential to the first radial distance. Also, while the rotating platform is rotating, the method moves the item, in an apparatus-controlled orderly path, from the center area to a point relative to the rotating platform that is adjacent a perimeter of the rotating platform and that is located at a second radial distance greater than the first radial distance; the item has a second speed tangential to the second radial distance and the second speed is greater than the first speed. Finally, while the rotating platform is rotating, the method moves the item, from the point, to a location beyond the perimeter of the rotating platform.

In another preferred embodiment, related apparatus are also described.

Other aspects are described and claimed.

BRIEF DESCRIPTION OF THE SEVERAL VIEWS OF THE DRAWING

The invention will be described in detail below by referring to the accompanying drawings.

DETAILED DESCRIPTION OF THE INVENTION

The preferred embodiments relate to a system for introducing cargo compartments into transit and are shown by a sequence from FIGS. 1 through 6. In one preferred embodiment, the cargo stored within an interior of the cargo compartments may be goods of various types, whereas in another preferred embodiment such cargo may be human passengers. As demonstrated initially in FIG. 1 and in subsequent Figures and discussion, the cargo compartments move in various fashions throughout the system. In this regard, certain different considerations may apply to compartments carrying humans, as compared to goods, as an implementation involving humans benefits from certain aspects so as to reduce, minimize, or eliminate certain impact or perception of such passengers as their compartment is transported through the system. Such considerations give rise to additional preferred embodiment aspects, as explored throughout this document. By way of general introduction, however, some of the following discussion generally refers to each cargo compartment, with it understood that its cargo may be humans, goods, or a combination thereof.

Starting with FIG. 1, the transit system includes a cargo compartment $CC_1$, which as shown in later Figures is to be loaded into, or onto, a railcar $R_1$ (see, e.g., FIG. 4) that will approach the system components along a travel direction TD. As discussed above, the cargo compartment $CC_1$ may carry within its interior various goods and/or human passengers—in the latter case, the cargo compartment $CC_1$ is constructed so as to comfortably accommodate a number of human passengers within its interior, with the ultimate intent of loading the compartment, and hence the passengers inside it, onto the railcar $R_1$. Railcar $R_1$ may be of various types represented in the railway industry, including above ground and underground (e.g., subway) systems, as well as other transit systems. Note that FIGS. 1 through 6 demonstrate certain inventive aspects, but do not include various details and also are not necessarily to scale.

Figure 1:
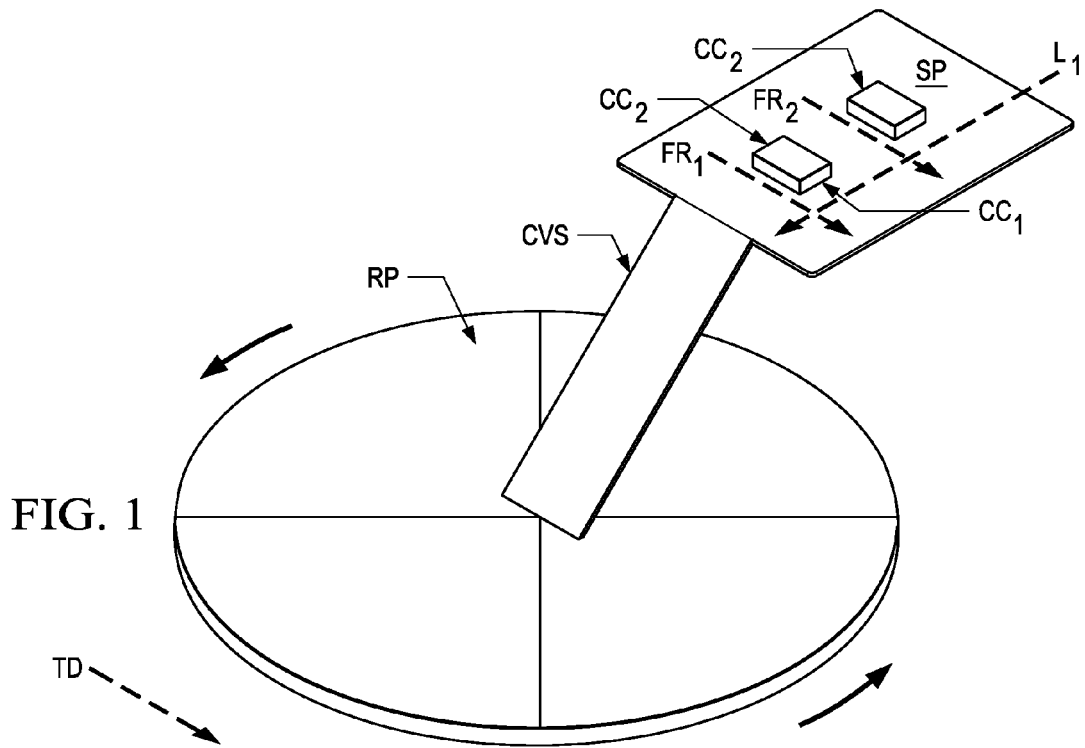
FIG. 1 illustrates a perspective view of a transit system for introducing a compartment, from a stationary platform, via a conveyor system and a rotating platform, to a railcar.

FIG. 1 in more detail illustrates three separate apparatus for ultimately loading the cargo compartment $CC_1$ onto the railcar $R_1$: (1) a stationary platform SP, where each cargo compartments, such as the cargo compartment $CC_1$, is initially located, such as after the passengers are situated inside the compartment; (2) a conveyor system CVS, having a first end adjacent the stationary platform SP, with its length extending downward from the platform; and (3) a rotating platform RP, having its center area located to receive the second end of the conveyor system CVS. Each of these apparatus is further discussed below.

In a preferred embodiment, the stationary platform SP is comparable in certain respects to a typical loading dock, that is, a location where one or more compartments may be filled (with persons/goods), located, oriented, and sequenced. In this regard, FIG. 1 illustrates a second cargo compartment $CC_2$ also located on the stationary platform SP, and for reasons discussed later preferably oriented in same direction as the cargo compartment $CC_1$. Further in regard to such orientation, in the preferred embodiments, and particularly when a compartment includes humans as its content, two different axes of orientation are established for each cargo compartment $CC_x$, so as to favor human factors consideration of the occupants, each of which is discussed below.

In a preferred embodiment, and as shown in FIG. 1, the cargo compartment $CC_1$ is shown to have a respective front-to-rear orientation axis $FR_1$, which in the example of human cargo is to be understood that the human passengers are seated within the interior in a direction facing along this axis, as would be the front to rear (or rear to front) direction in the sense of sitting within a moving vehicle. For reasons more clear below, the compartment is oriented so that its front-to-rear orientation axis $FR_1$ eventually aligns (i.e., is substantially parallel with) with the travel direction TD of a railcar as that railcar approaches the rotating platform RP.

Also in a preferred embodiment, and as shown in FIG. 1, the cargo compartment $CC_1$ is shown to have a lateral orientation $L_1$, so as to represent a dimension that is lateral, that is, approximately perpendicular to, the respective front-to-rear orientation axis $FR_1$. Indeed and as further appreciated below, initially with respect to the stationary platform SP, as well as the conveyor system CVS, the cargo compartment $CC_1$ is moved along the lateral orientation $L_1$.

In any event, returning to the stationary platform SP, it is provided with sufficient dimensions, materials, and apparatus so that a plural number of cargo compartments may be located on the platform, preferably in a like orientation, and where each such compartment may be sequentially shifted off of the platform SP also in a same direction, as further explored below.

In a preferred embodiment, the conveyor system CVS is provided with sufficient dimensions, materials, and apparatus so as to convey, in succession, a number of cargo compartments from the stationary platform SP to the center area of the rotating platform RP. Preferably the descent of each cargo compartment, from the stationary platform SP to the rotating platform RP, is along an angle (i.e., non-vertical) as illustrated; in an alternative embodiment, however, an elevator-type mechanism may be used so that each descending cargo compartment moves along a substantially vertical path. In one preferred embodiment, the vertical distance of descent is approximately 10 feet, as between the stationary platform SP and the rotating platform RP, although such a distance may be adjusted in other preferred embodiments. Preferably, the conveyor system CVS also includes apparatus so as to maintain each conveyed cargo compartment in a relatively stable horizontal plane during movement between the stationary platform SP and the rotating platform RP. In one approach, therefore, the conveyor system CVS may operate in the form of an enlarged escalator device, whereby each successive step (or horizontal platform) of such an escalator is sufficiently large so as to carry one (or more) cargo compartment, and wherein each such cargo compartment is maintained in a substantially horizontal plane during its descent from the stationary platform SP to the rotating platform RP. Another approach may use some type of overhead connection and transport system with respect to each cargo compartment, akin therefore in some respects to a gondola lift-type mechanism, as further explored in connection with FIGS. 10 through 16, described later.

In a preferred embodiment, the rotating platform RP is provided with sufficient dimensions, materials, and apparatus so as to receive each cargo compartment, from the conveyor system CVS, at or near the center of rotating platform RP, while the rotating platform RP supports the weight of any such cargo compartment(s) and also while the rotating platform RP rotates. As indicated generally by two curved arrows in FIG. 1, therefore, the rotating platform RP is operable to rotate, and in the example of the Figures the rotation is in a counterclockwise direction. Moreover, as further appreciated below, the rotating platform RP has a diameter and rotational speed whereby the compartment moves from the center of the rotating platform RP to the outer perimeter of that platform, at which time the diameter and rotation speed of the platform contribute to a tangential speed, at the outer edge of the rotational platform (i.e., to its cross-radial velocity component at that point) as applied to the cargo compartment. As appreciated below, this tangential speed allows the cargo compartment to be shifted to a railcar having a velocity matching that tangential speed, that is, permitting the cargo compartment to move without substantial change in speed or direction, from an edge of the rotating platform to the railcar.

The general operation of the system is now discussed with reference to the sequence of events depicted in FIGS. 1 through 6, starting first with FIG. 1. In FIG. 1, the first cargo compartment $CC_1$ is located on the stationary platform SP, and with appropriate apparatus and timing it is advanced toward, and introduced to move onto, the conveyor system CVS. In a preferred embodiment, the cargo compartment $CC_1$ is accelerated, on the stationary platform SP, from rest to a constant speed, at which time it is moved to the conveyor system CVS. This speed will depend on various considerations, including human factors and system apparatus dimensions as well as desired transit speed, as explored later by way of example. Also preferably, the acceleration to such speed is along the lateral direction, so, for example, the first cargo compartment $CC_1$ is moved along the lateral orientation $L_1$.

As a result, if the first cargo compartment $CC_1$ is carrying humans, their sensation should be of acceleration from zero to this speed, in the lateral direction.

The conveyor system CVS, possibly with the assistance of gravity, conveys the first cargo compartment $CC_1$ from the stationary platform SP to the center area of the rotating platform RP, preferably maintaining the constant speed at which the first cargo compartment $CC_1$ was received by the conveyor system CVS from the stationary platform SP. Preferably, such movement continues along the lateral orientation $L_1$ and again while maintaining the compartment in a horizontal orientation; thus, if there is no (or little) acceleration from the speed at which the cargo compartment $CC_1$ was received by the conveyor system CVS, then any human occupant should sense primarily only a gravitational force downward, with little or no sensation in the lateral direction. While not shown in FIG. 1, as shown in later Figures, while the cargo compartment $CC_1$ is descending as just described, as a same time a railcar, such as the railcar $R_1$ in FIG. 4, may advance toward the rotating platform so as to approach in the travel direction $TD_1$, or in any event so as to eventually tangentially approach the outer perimeter of the rotating platform RP.

Figure 2:
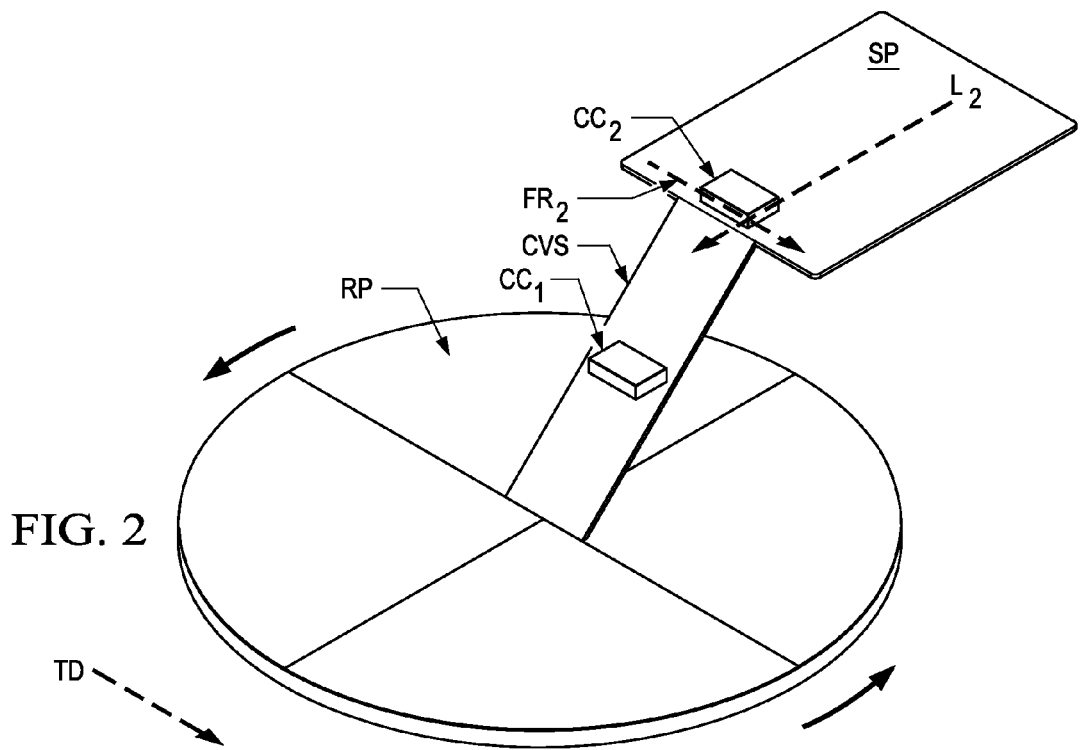
FIG. 2 illustrates the system of FIG. 1 where a compartment of FIG. 1 has advanced along the conveyor system and an additional compartment has moved along the stationary platform.

In FIG. 2, the first cargo compartment $CC_1$ has advanced downward, along a portion of the conveyor system CVS and in the lateral orientation $L_1$, toward the center area of the rotating platform RP. Optionally also during the time represented by FIG. 2, the second cargo compartment $CC_2$ has moved, also by accelerating from zero to the above-noted desired speed, in its comparable lateral orientation (which will be the same direction as was the lateral orientation $L_1$ for the cargo compartment $CC_1$), to the edge of the stationary platform SP. The second cargo compartment $CC_2$ is thus prepared to next advance along the conveyor system CVS, in a manner timed to safely and accurately follow the advancement of the first cargo compartment $CC_1$. Note that while only two cargo compartments are shown in FIG. 1, the present inventive scope contemplates that any number of such compartments could and would benefit from being positioned to advance along the stationary platform SP sequentially behind the first cargo compartment $CC_1$. Indeed, based on the remaining discussion herein, additional structure and methodology aspects may be developed in terms of timing, efficiencies, and the like, in improving or optimizing the general conveyance of cargo compartments to and from railcars, consistent with the other apparatus described herein.

Figure 3:
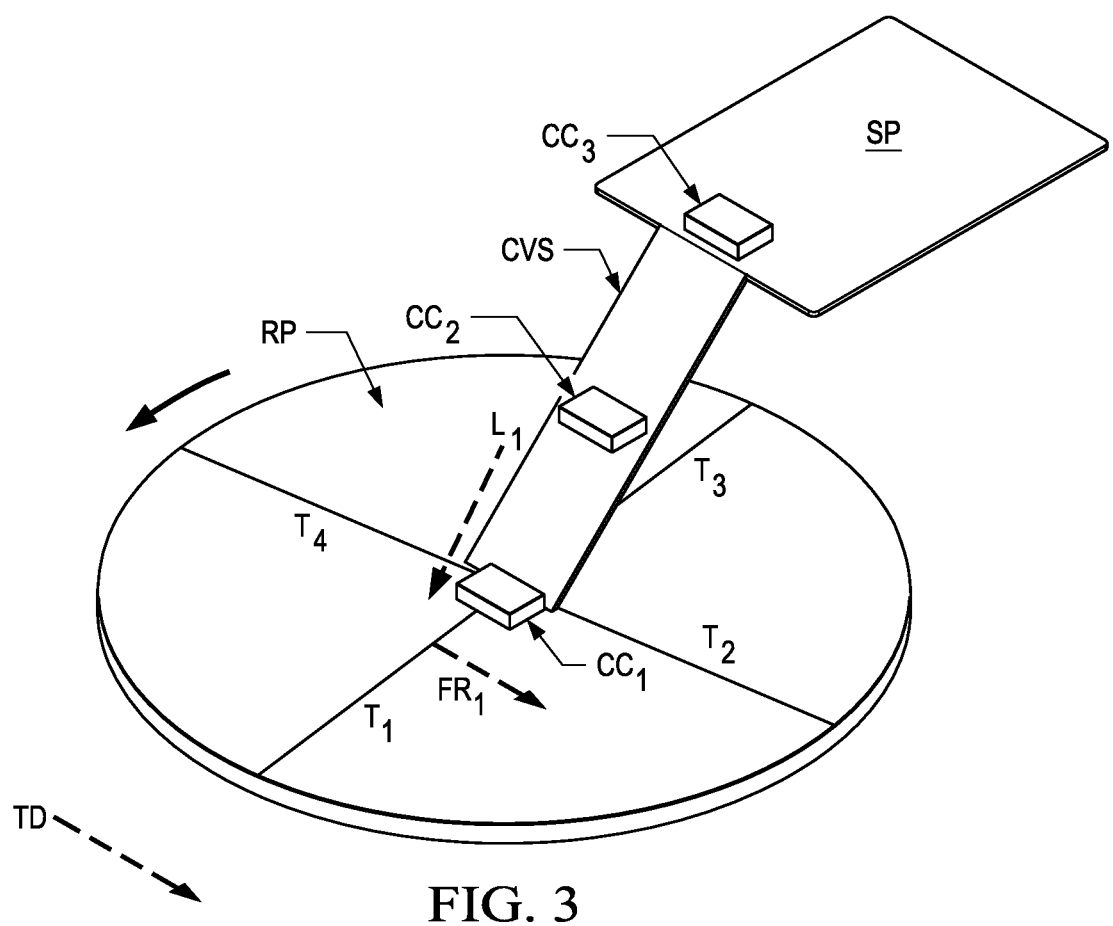
FIG. 3 illustrates the system of FIG. 2 where the first compartment of FIG. 2 from the conveyor system is delivered to a center area of the rotating platform.

In FIG. 3, the first cargo compartment $CC_1$ has continued its lateral advancement (and descent) along the conveyor system CVS, and it reaches the center area of the rotating platform RP. Note that the first cargo compartment $CC_1$, and its occupants (or goods), arriving at the center area of the rotating platform RP, will experience a considerably lesser sense of force in the direction of the front-to-rear orientation axis $FR_1$, as compared to that which exists in a radial direction away from the center. Particularly, although the rotating platform RP operates at some preferred rotational speed (sometimes referred to as speed of revolution), the speed perpendicular to the radius near the center of the rotating platform RP is far less than that at its perimeter and is proportional to the location along the rotating platform RP radius. Thus, the closer the cargo compartment (e.g., $CC_1$) arrives to the absolute center of the rotating platform RP, the lesser amount of speed in this direction it will encounter. In this regard, in a preferred embodiment, the cargo compartment is delivered to a radial distance on the rotating platform RP that is no greater than 20 percent of the total radius of the rotating platform RP, and preferably at a radial distance on the rotating platform RP that is no greater than 10 percent of the total radius of the rotating platform RP.

Also in a preferred embodiment, the linear speed in the direction along the lateral orientation $L_1$, obtained during the movement of the cargo compartment $CC_x$ along the stationary platform SP, as preferably maintained during the descent along the conveyor system CVS, is matched or not substantially changed, in that orientation, at the instance that the cargo compartment is delivered from the conveyor system CVS to the center area of the rotating platform RP. In this regard, and for reasons more evident below, when the first cargo compartment $CC_1$ is delivered to the rotating platform RP, it then aligns with one of a number of tracks located on the rotating platform RP. For sake of simplification, the example of FIG. 3 (and others) includes four such tracks $T_1$ through $T_4$. Each track $T_x$ provides a radial path from the rotating platform RP center area to its outer perimeter. Moreover, in order to maintain a constant (or near constant) speed in the direction along the lateral orientation $L_1$, then preferably the descent of the cargo compartment $CC_x$, and the rotation of the rotating platform RP, are timed so that a track aligns with the direction along the lateral orientation $L_1$ when the compartment arrives to the rotating platform. For example, therefore, in FIG. 3 when the first cargo compartment $CC_1$ is delivered to the rotating platform RP, it aligns with track $T_1$, which also aligns along the lateral orientation $L_1$ path that the compartment followed both on the stationary platform SP and along the conveyor system CVS. In this regard, human occupants, if any, should continue to experience a constant speed in this direction.

Lastly in FIG. 3, a third cargo compartment $CC_3$ is positioned on the stationary platform SP, while the second cargo compartment $CC_2$ has begun its descent along the conveyor system CVS, with its axes of orientation maintained as was done with the cargo compartment $CC_1$. Moreover, the third cargo compartment $CC_3$ is positioned on the stationary platform SP, so as to next advance along the conveyor system CVS in a manner timed to follow the advancement of the first and second cargo compartments $CC_1$ and $CC_2$.

Figure 4:
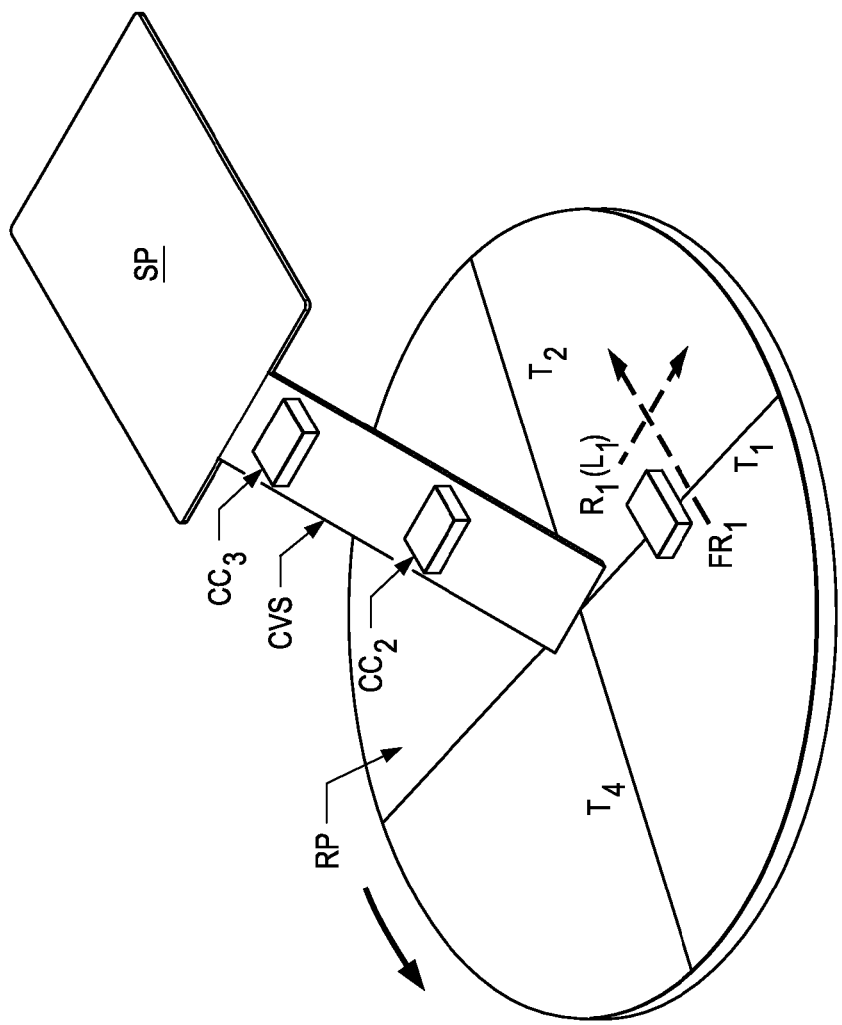
FIG. 4 illustrates the system of FIG. 3 where the first compartment of FIG. 3 from the rotating platform center area has advanced radially to a first point along a track in the rotating platform.
Figure 4:
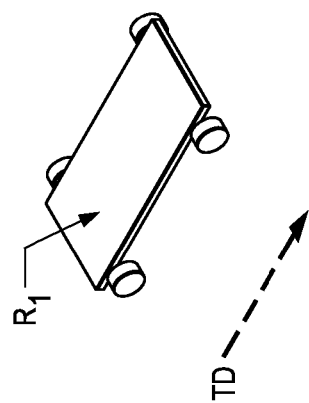

In FIG. 4, the railcar $R_1$ is advancing toward the perimeter of the rotating platform RP, and appears in the Figure along the travel direction TD, with that direction introduced and shown in FIGS. 1 through 3. In the meantime, with the first cargo compartment $CC_1$ having been delivered to the track $T_1$ of the rotating platform RP, and while the rotating platform RP continues to rotate, the first cargo compartment $CC_1$ now moves radially outward, from the center area, and in a mechanically-guided, controlled, and orderly (i.e., non-random) fashion, toward the outer perimeter, of the rotating platform RP. Such motion may be assisted in part by the centrifugal force that arises from the rotation of the rotating platform RP, as well as via various apparatus aligned with the track $T_1$. Note also, therefore, what is now the direction of radial movement with respect to the rotating platform RP, was formerly the direction along the lateral orientation $L_1$, so in FIG. 3 such direction is shown as a radial direction $R_1(L_1)$. Again, therefore, human occupants, if any, should continue to experience a constant speed in the radial direction $R_1(L_1)$. In the meantime, however, as the first cargo compartment $CC_1$ moves radially in this fashion, it will appear at an increasingly larger radial distance from the center of the rotating platform RP. Thus, the human occupants, if any, will experience a sense of acceleration in a direction perpendicular to the radius of the rotating platform; recall, however, that starting from the stationary platform SP, and through the descent on the conveyor system CVS, a front-to-rear orientation axis $FR_1$ was established and maintained, and one skilled in the art should now appreciate therefore that this orientation is parallel to the acceleration that is perpendicular to the rotating platform RP radius. As a result, any occupant of the cargo compartment should experience a front-to-rear (or rear-to-front) sense of acceleration, which should be comparable therefore to typical transit in cars, rail, or the like. Thus, with the aspects thus described, the preferred embodiments endeavor to limit the human perception of non-zero net acceleration to be only in one dimension at a time, so as to avoid any discomfort, vertigo, or the like, as might be expected if a human perceives simultaneous non-zero net acceleration in more than one geometric plane at a time. In addition, the preferred embodiment aspects relating to orientation as described also may be favorable to avoid shifting, damaging, and load-balance issues associated with contents inside a cargo compartment, even if such contents do not include human passengers.

Also shown in the FIG. 4 sequence is that the second cargo compartment $CC_2$ has advanced along a portion of the conveyor system CVS, away from the stationary platform SP and toward the rotating platform RP, while at the same time the third cargo compartment $CC_3$, previously positioned on the stationary platform SP, has begun its respective descent along the conveyor system CVS. The third cargo compartment $CC_3$ is therefore timed to follow the advancement of the first and second cargo compartments $CC_1$ and $CC_2$.

Figure 5:
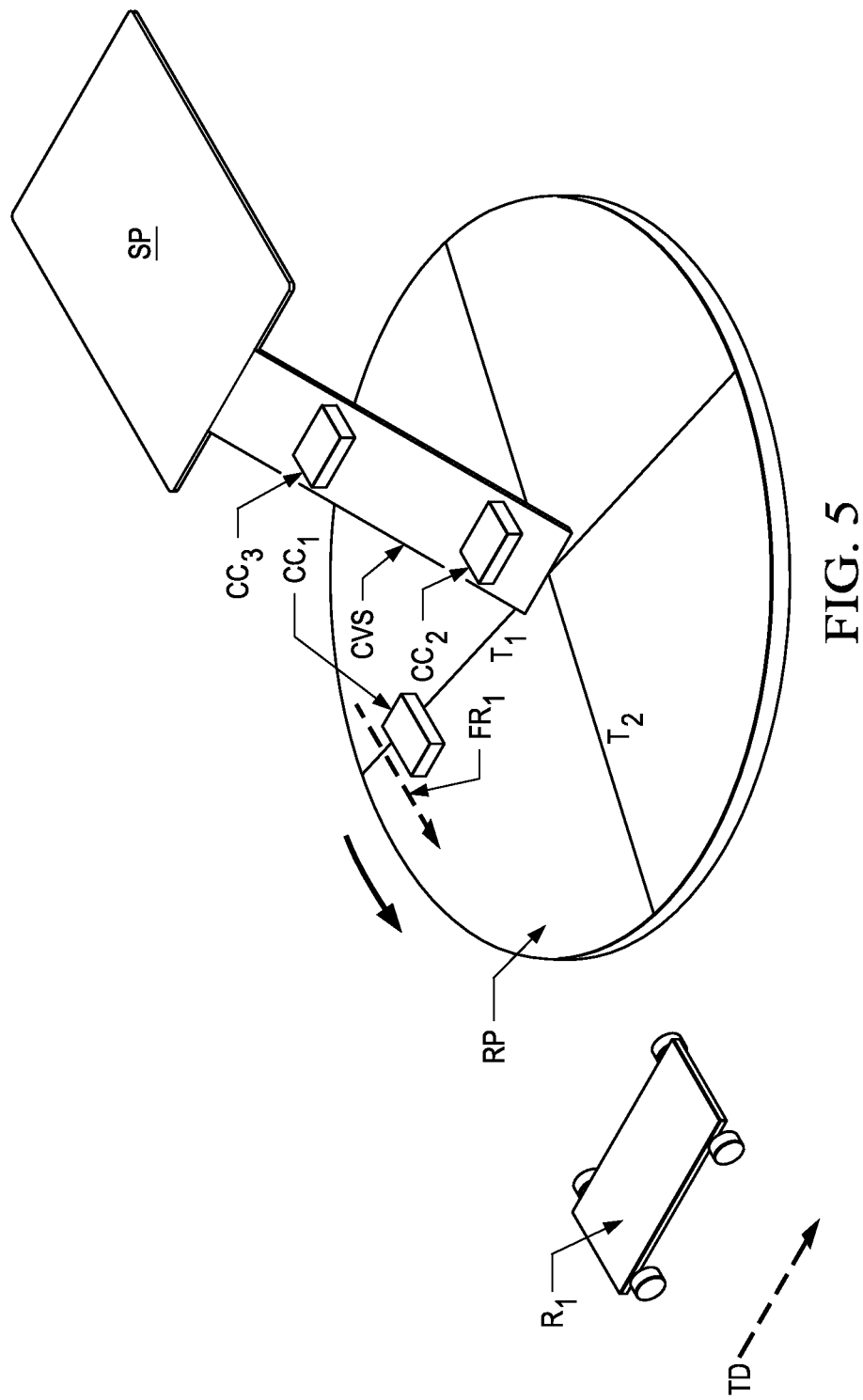
FIG. 5 illustrates the system of FIG. 4 where the first compartment of FIG. 4 has advanced radially to a second point approaching the perimeter of the rotating platform, while the second compartment has advanced along the conveyor system toward the center area of the rotating platform.

In FIG. 5, the first cargo compartment $CC_1$ has advanced radially outwardly along the track $T_1$, again in a mechanically-guided, controlled, and orderly fashion, thereby moving farther from the rotating platform RP center area toward its outer perimeter. And the railcar $R_1$ has advanced still closer to the perimeter of the rotating platform RP, as compared to FIG. 4, so that by appropriate timing the first cargo compartment $CC_1$ may be next loaded onto the railcar $R_1$, as further explored below. In the meantime, the second cargo compartment $CC_2$ has advanced along the conveyor system CVS to approach the rotating platform RP center area, at which point it will align with the next unoccupied track, shown in the example as track $T_2$. Also, the third cargo compartment $CC_3$ has advanced along a portion of the conveyor system CVS away from the stationary platform SP and toward the rotating platform RP, while at the same time a fourth cargo compartment $CC_4$ is positioned on the stationary platform SP.

Figure 6:
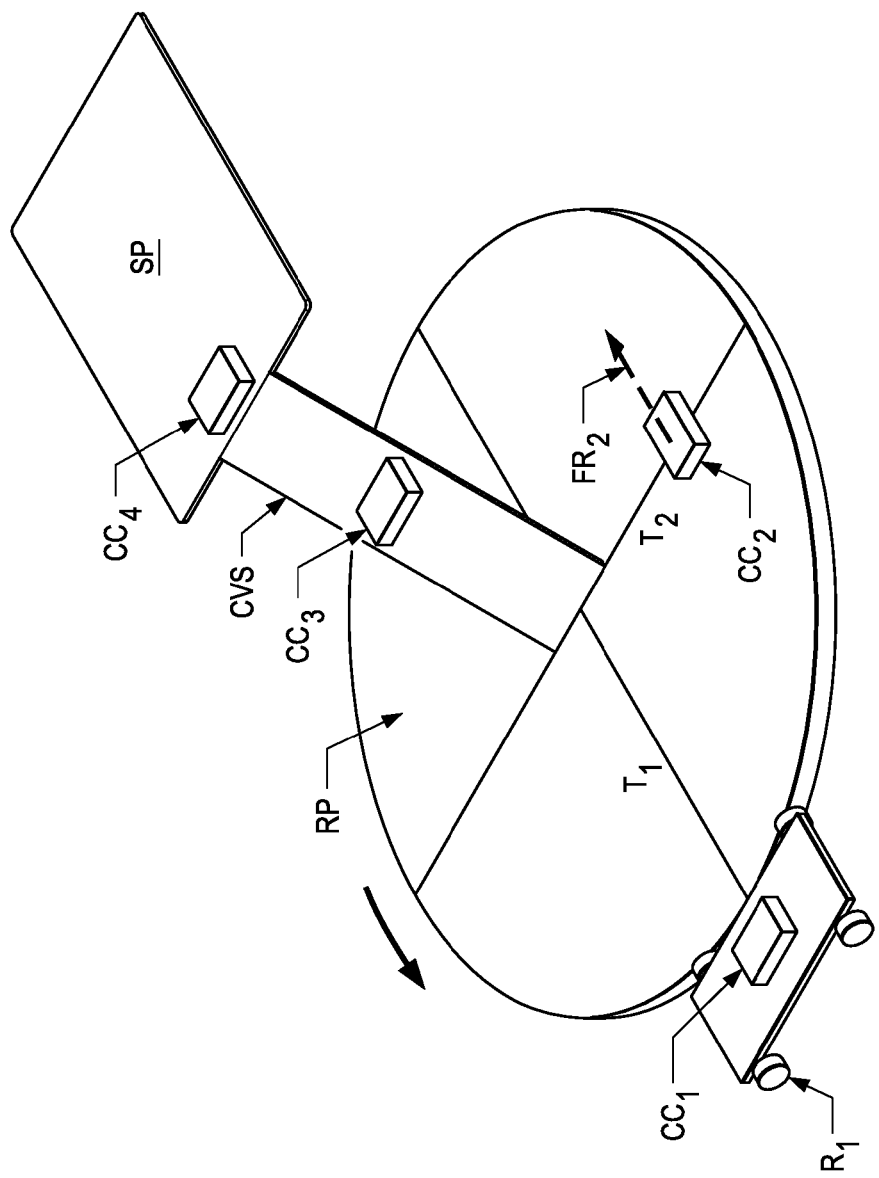
FIG. 6 illustrates the system of FIG. 5 where the compartment of FIG. 5 from near the perimeter of the rotating platform center has advanced radially to a transit vehicle (e.g., railcar) adjacent the perimeter of the rotating platform, while the second compartment has advanced radially to a first point along a track in the rotating platform.
Figure 6:
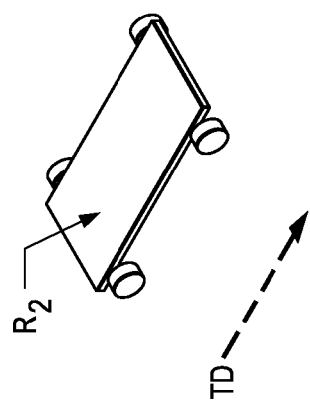

In FIG. 6, the railcar $R_1$ reaches a location immediately adjacent the perimeter of the rotating platform RP, while at the same time the first cargo compartment $CC_1$ reaches that perimeter. Indeed, the inventive scope contemplates sufficient electromechanical control and apparatus, including a programmable system, so as to control timing and transition, whereby a cargo compartment will so reach the rotating platform RP perimeter, or will be retained at that perimeter, until and when the railcar $R_1$ reaches a position for receiving the cargo compartment. In this regard, the railcar $R_1$, either alone or in combination with other linked cars or the like, is preferably robotically or otherwise controlled by, or in communication with, the same computer program that synchronizes the speed of rotation for the rotating platform RP and the radial speed of the cargo compartment $CC_1$. As a result, there is coordination of all three aspects, namely, cargo compartment radial speed, cargo compartment acceleration to a delivery point adjacent the rotating platform perimeter as further affected by the platform rotational speed, and arrival and alignment of the railcar $R_1$ to a position acceptable to accept the cargo compartment adjacent the perimeter edge of the rotating platform RP. In FIG. 6, therefore, the first cargo compartment $CC_1$ is loaded by releasing and transferring it from the rotating platform RP edge, or any extension thereof, onto the railcar $R_1$, with apparatus (not shown) and again potentially assisted such as with propulsion to accommodate the appropriate forces—for example, a sufficient radial force is applied to the compartment so as to move it to the railcar and to overcome any forces in a direction other than onto the railcar (e.g., to overcome any tangential force along the edge of the rotating platform RP). In this regard, various couplings may be included, although certain use of electromagnets may be limited, or eliminated, due to potential issues interfering with pacemakers or the like. In any event, at this point, recall also that the cargo compartment $CC_1$ was oriented as shown by its axes $FR_1$ and $L_1$ in FIG. 1, and note now that such an orientation has been maintained through FIGS. 2 through 5, and onward to FIG. 6, so that occupants inside the compartment, if any, will at this point have a sense of front-to-back speed equal to the tangential speed at the rotating platform RP perimeter, as well as that same speed of the railcar $R_1$. Moreover, note further at this point that such occupants will, due to maintaining this orientation as the cargo compartment $CC_1$ moved radially in FIGS. 3, 4, 5, and 6, will have sensed acceleration primarily only in the front-to-rear sense, that is, as they moved to a greater and greater radius, their front-to-rear tangential speed (or speed perpendicular to the radius) increases, which is aligned with their front-to-rear orientation axis $FR_1$, while in the meantime the radial speed (left-to-right, that is, along the lateral orientation axis $L_1$) is maintained substantially the same as it was from the stationary platform SP as well as along the conveyor system CVS. In this sense and with this orientation, therefore, as the compartment is located at any location radially on the revolving platform RP, the horizontal g-forces are front-to-back along the orientation axis $FR_1$ ("eyeballs in" in aerospace parlance) and for humans should be well tolerated. Indeed, such forces may well be less than those experienced in ordinary automobile (or other vehicle) acceleration. Thus, the magnitude of the major acceleration is a function of the radius (or diameter) and speed of the rotating platform RP, turntable, as well as the radial speed of the compartment. With the preferred embodiment orientation axes $FR_1$ and $L_1$, g-force experience is avoided from occurring simultaneously in more than one plane, thereby avoiding vertigo and motion sickness.

The remaining aspects of FIG. 6 illustrate that the above process may repeat for additional cargo compartments, in successive fashion following the loading of the first cargo compartment $CC_1$ onto the railcar $R_1$. Thus, the second cargo compartment $CC_2$ advances radially outward along the track $T_2$, from the rotating platform center area, toward the perimeter of the rotating platform RP, and while maintaining its front-to-rear orientation axis $FR_2$ in a direction perpendicular to the radial track $T_2$, while also being timed with an approaching second railcar $R_2$, which should arrive adjacent the outer perimeter of the rotating platform RP so as to comparably receive the second cargo compartment $CC_2$, in the manner that the railcar $R_1$ received the first cargo compartment $CC_1$. Also in the meantime, the third cargo compartment $CC_3$ and the fourth cargo compartment $CC_4$ advance downward from the stationary platform SP, along the conveyor system CVS, to the rotating platform RP, where they too will radially advance along respective tracks, from center to perimeter, so as to load onto respective railcars.

Given the above, the inventive scope contemplates a rotating platform for loading materials or cargo, preferably in the form of units that may carry human passengers or goods, so that the outer perimeter of the rotating platform may deliver each unit to a transit vehicle, such as a railcar. Importantly, note that so long as the rotating platform is rotating, with a determined rotational speed and radius, the tangential speed at its perimeter may be matched to the speed of the railcar (or other vehicle) as it passes nearby the rotating platform perimeter. Thus, provided proper timing is achieved in transitioning, releasing, or ejecting the cargo compartment from the rotating platform perimeter, the cargo compartment may be loaded onto the railcar without requiring the railcar to come to a stop. With this result, therefore, the time and energy otherwise required in starting and stopping transit vehicles may be reduced and potentially eliminated. Moreover, with the remainder of the timing and delivery brought by an initial platform, and the delivery of the compartment to the rotating platform center area, an orderly transition may be achieved, with comfort and physiological considerations of human occupants, so that an initial loading of the compartment may be achieved on a still platform, while the compartment is effectively accelerated to a tangential speed in the tens of miles per hour (e.g., 50 mph) by advancing the compartment in an apparatus-assisted and orderly transition in a radial fashion along the rotating platform. Moreover, the rotating platform may continuously spin during loading in this manner, thereby carrying a plurality of different compartments, along a plurality of (e.g., respective) tracks, so as to load multiple compartments to one or more railcars. Indeed, different compartments may be pre-scheduled to different railcars and different destinations, where for example at one destination certain compartments may be removed from the moving train, again using a system as shown but in reverse direction, while others remain on the non-stop railcar. Such results could have profound implications on energy and travel considerations.

To further demonstrate the above aspects, and only by way of an illustrative example, various measures are now proposed for a system as in FIGS. 1 through 6. In such an example, assume that the rotating platform has a diameter of 100 fee (i.e., radius=50 feet, circumference=$2\pi r$=314 feet). Assume further that the railcar $R_x$ passes tangentially to this rotating platform at a speed of 50 miles per hour (i.e., approximately 73.33 ft/sec). Accordingly, at a tangential location at the rotating platform perimeter, a rotating platform speed of revolution of 0.234 rev/second results in a tangential speed of 50 miles per hour (i.e., 0.234 rev/second*314 ft=73.33 ft/sec). Thus, the rotating platform perimeter matches the speed of the tangentially-passing railcar $R_x$, and a cargo compartment $CC_x$ at that perimeter will be traveling in the tangential direction at the same speed as the railcar $R_x$, thereby allowing the cargo compartment $CC_x$ to be transferred to the railcar $R_x$ as taught above. Also with these example numbers, recall that the cargo compartment $CC_x$ preferably moves laterally from the rotating platform center area to its outer perimeter; in the present example radius of 50 feet, then a lateral speed of 5 miles per hour will achieve this movement in approximately 7 seconds—hence, consistent with the earlier discussion, then preferably the cargo compartment $CC_x$ was accelerated to a lateral speed of 5 miles per hour when it was first accelerated on the stationary platform SP, and that speed is maintained during the travel along the conveyor system CVS and becomes radial speed along a track $T_x$ in the rotating platform RP. Lastly, with these numbers, note therefore that the acceleration along the front-to-rear orientation axis $FR_1$ will be from 0 miles per hour when the cargo compartment $CC_x$ first arrives in the rotating platform center area to 50 miles per hour at its perimeter. Having established that it will take approximately 7 seconds, at the 5 mph lateral speed, for the compartment to travel from the center area to the perimeter, then the occupants will experience, along the front-to-rear orientation axis $FR_1$, an acceleration of 0-50 mph in those approximated 7 seconds. The above numbers, therefore, are representative of one implementation and demonstrate various aspects and viability, while of course being subject to change based on numerous considerations.

The preferred embodiments also contemplate movement of cargo compartments in the reverse direction as described above, thereby transferring a cargo compartment CC from a moving railcar $R_x$ to the edge of the rotating platform RP, advancing the cargo compartment radially, along a track $T_x$, toward the center area of the rotating platform RP, and from that area, the conveyor system CVS, or a like conveyor system, will transfer the cargo compartment CC to a stationary platform SP, at which location the compartment occupants or contents may be removed or otherwise shipped to another location. Such movement may be facilitated by using forces opposite those described above, for example, using a closed system (e.g., a chain or other link), whereby a force in one direction responds with a force in an opposite direction. In this regard, therefore, the same system as shown in FIG. 1 may be used to return one or more compartments from a railcar, to the rotating platform perimeter and toward the center area, while simultaneously delivering others from the center area, toward the perimeter and onto a corresponding railcar(s). Alternatively, a cargo compartment may remain on the same rotating platform and then advance outwardly in a radial fashion so as to be released to a different railcar, such as at a junction station (e.g., in a subway) so as to effectively move the compartment from one line to another.

Figure 7:
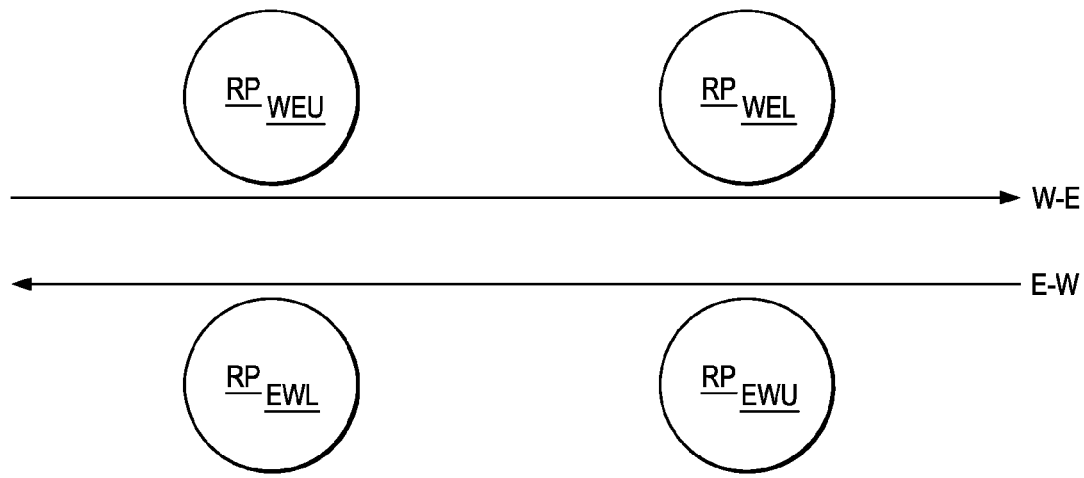
FIG. 7 illustrates a top down block diagram view of two railway lines, each with a loading rotating platform and an unloading rotating platform.

Numerous other combinations of rotating platforms and transportation lines are contemplated and still others may be developed by one skilled in the art, given the teachings of this document. FIG. 7, for example, illustrates a block diagram of two rail lines, one traveling west-to-east (W-E) and another line traveling east-to-west (E-W). The W-E line has two associated rotating platforms, one $RP_{WEU}$ for unloading cargo compartments from the line and another $RP_{WEL}$ for loading cargo compartments onto the line. Comparably, the E-W line also has two associated rotating platforms, one $RP_{EWU}$ for unloading cargo compartments from the line and another $RP_{WWL}$ for loading cargo compartments onto the line. Note also that while each rail line is shown as a linear path tangential to a rotating platform, a preferred embodiment also may have a different shape in the rail car path. For example, the shape of the rail line as it approaches, and leaves, the vicinity of the rotating platform RP may be a non-linear path so as to further accommodate the handoff of a cargo compartment to a rail car on that line. The non-linear path, for instance, may follow the curvature of a segment of the rotating platform RP, either by duplicating the perimeter curvature or by bending somewhere between a linear path and a path that is parallel to the perimeter curvature. Numerous other approaches may be implemented so as to accommodate various lines and various distribution strategies. For example, the system of the earlier Figures may be duplicated, or replicated numerous times, so that one or more rotating platforms are used, such as at a station, to service a same train with perhaps multiple different cars being served by a first platform while others are serviced by a second platform. As another example, a single rotating platform may distribute cargo compartments to one rail line while simultaneously removing cargo compartments from another rail line. As still another example, a single rotating platform may remove a cargo compartment from one rail line and then, without returning the cargo compartment to the center area of that rotating platform, may release the cargo compartment to another rail line. Still other variations for either delivering compartments to, or removing compartments from, such railcars, may be contemplated within the inventive scope.

Figure 8:
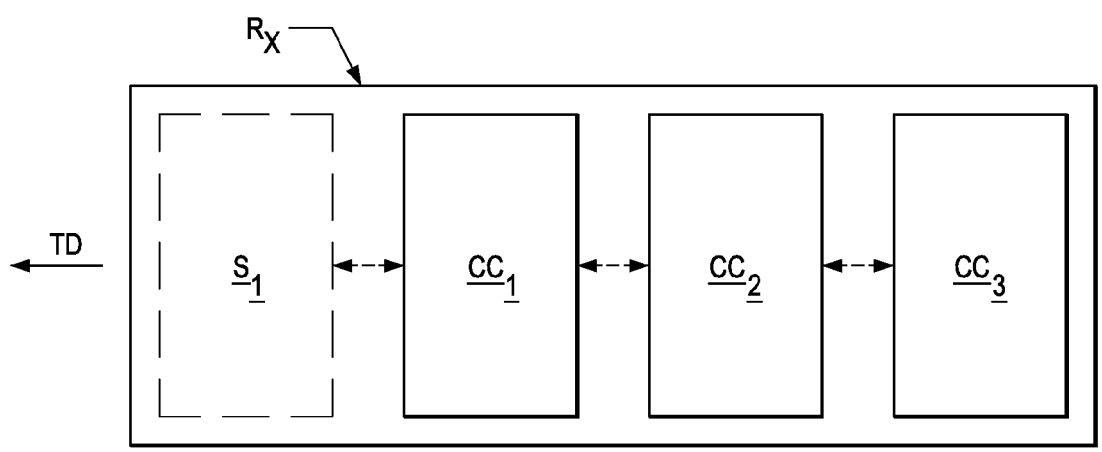
FIG. 8 illustrates a top down block diagram view of a railcar with cargo compartment positions, including an empty front slot and three occupied slots.

Additional aspects of the preferred embodiment involve the location of cargo compartments onto a railcar, as is explored in general in FIG. 8. In this regard, FIG. 8 illustrates a block diagram of a railcar $R_x$, where three cargo compartments $CC_1$, $CC_2$, and $CC_3$ are situated on the railcar. In a preferred embodiment, a slot $S_1$, dimensioned the size of a cargo compartment, is also provided for loading and unloading of each cargo compartments, and preferably the slot $S_1$ is at the front of the railcar $R_x$, given the expected travel direction TD of that railcar. In this approach and assuming initially that the railcar $R_x$ is not yet carrying a cargo compartment, then as the railcar $R_x$ approaches a rotating platform as described above, a cargo compartment $CC_x$ is loaded into the slot $S_1$. Then, as the railcar $R_x$ continues to travel (again, without having to stop), the loaded cargo compartment $CC_x$ may be shifted toward the rear of the railcar $R_x$, as by apparatus that may be ascertained by one skilled in the art and as shown in the Figure by way of bi-directional dashed arrows. In the present example, therefore, the cargo compartment $CC_3$ may be first received by the railcar $R_x$, and shifted at least one compartment position toward the rear of the railcar $R_x$, thereby again leaving the slot $S_1$ vacant. In time, therefore, another cargo compartment (e.g., $CC_2$) may be received into the slot $S_1$ from a rotating platform, and either prior to or after that the earlier-received cargo compartment $CC_3$ was received, the earlier-received cargo compartment $CC_3$ may be shifted one location toward the rear of the railcar. In this fashion, therefore, up to four cargo compartments may at one time be located on the railcar $R_x$, and if desirable the frontward position may be used for each load or unload of a cargo compartment CC.

Figure 9:
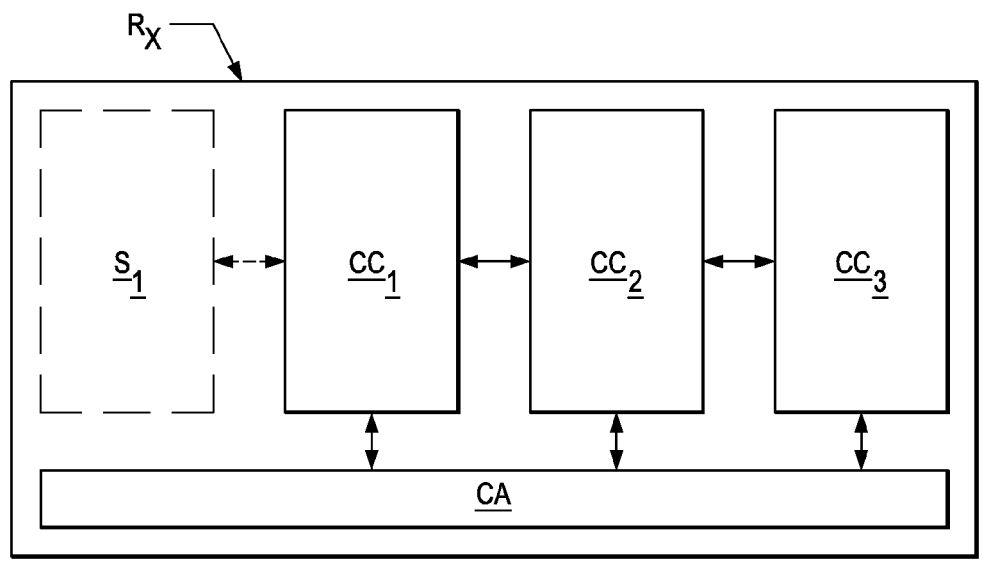
FIG. 9 illustrates a top down block diagram view of the railcar of FIG. 8, with the addition of a common area that is accessible to occupants of any of the cargo compartments.

FIG. 9 repeats in various respects the illustration of FIG. 8, but depicts an additional preferred embodiment where railcar $R_x$ includes a common area CA. In this preferred embodiment, an occupant of any cargo compartment $CC_x$ may move, via a pathway shown as a bi-directional arrow, either between a given cargo compartment and the common area CA, or as between adjacently-located cargo compartments. For example, therefore, certain utilities, such as bathrooms, dining, and the like may be located in the common area CA, and passengers may thereby temporarily avail themselves of such amenities prior to returning to a cargo compartment.

The FIG. 9 embodiment aspect of permitting passengers to move among different compartments also permits a methodology embodiment with respect to desired destinations. More particularly, in one preferred embodiment of the system described above, a particular cargo compartment $CC_x$ is associated with a single destination, that is, because the entire cargo compartment $CC_x$ is removed at once, then in such an embodiment all occupants should be intending at arriving at a same destination. For example, all occupants at the stationary platform SP seeking to arrive in City 1 may be loaded into a single cargo compartment $CC_1$, which is then loaded onto a railcar $R_1$ and unloaded at the City 1. With the FIG. 9, embodiment, however, certain scheduling and methodologies may be improved whereby once a passenger is on a railcar carrying multiple cargo compartments, then the passenger may choose a destination by selecting and moving to a different compartment, where the destination is desired for that compartment. For example, assume cargo compartment $CC_1$ is destined for a City 1, cargo compartment $CC_2$ is destined for a City 2, and cargo compartment $CC_3$ is destined for a City 3. Thus, once a passenger is aboard any of the three compartments on a singular railcar, the passenger may accomplish his or her destination by occupying the proper cargo compartment at the time that compartment is removed from the railcar, at its desired and corresponding destination.

Figure 10:
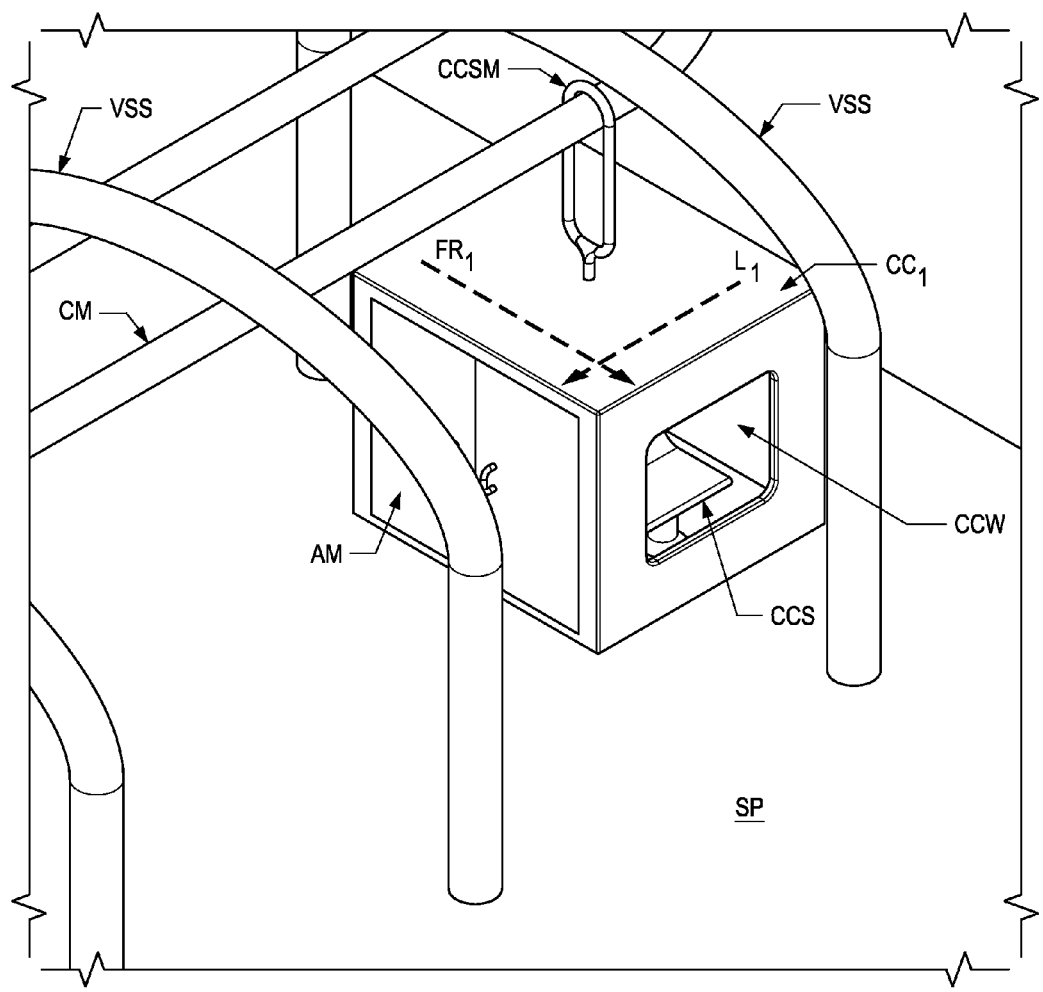
FIG. 10 illustrates a perspective three-dimensional view of a cargo compartment supported by an overhead compartment transport system.

FIG. 10 illustrates a perspective three-dimensional view of a compartment $CC_1$ for use in a system as described generally above. By way of other desirable features, the compartment $CC_1$ includes an access mechanism AM, such as one or more doors. In addition, and particularly desirable where the compartment $CC_1$ is for carrying human occupants, it further includes a window CCW as well as seating CCS.

Also in FIG. 10, the compartment $CC_1$ is positioned relative to the stationary platform SP, but in this embodiment the compartment $CC_1$ is supported not in contact with, but above, the surface of that platform by an overhead compartment transport system; thus, during the subsequent movement, the compartment $CC_1$, rather than coupling to, moves slightly elevated above, the platform. By way of example but without limitation, in FIG. 10 the overhead compartment transport system includes three aspects: (1) a cargo compartment support mechanism CCSM that supports the cargo compartment $CC_1$ from an overhead position relative to the compartment; (2) a conveyor mechanism CM, coupled to compartment $CC_1$ by the compartment support mechanism CCSM; and (3) a vertical support structure VSS, which in the example of FIG. 10 (and later Figures) is shown as a series of arch structures, so as to physically support the weight and functionality of the conveyor mechanism CM, the compartment support mechanism CCSM, and the corresponding compartment $CC_1$. As also appreciated from the remaining discussion, various of the FIG. 10 structure may be repeated in connection with additional compartments or different radii on the rotating platform RP. Note also that for human considerations, including safety as well as human perception as further explored below, preferably the compartment $CC_1$ is suspended at a vertical height that is close to the stationary platform, such as within a foot or less in terms of inches.

Figure 11:
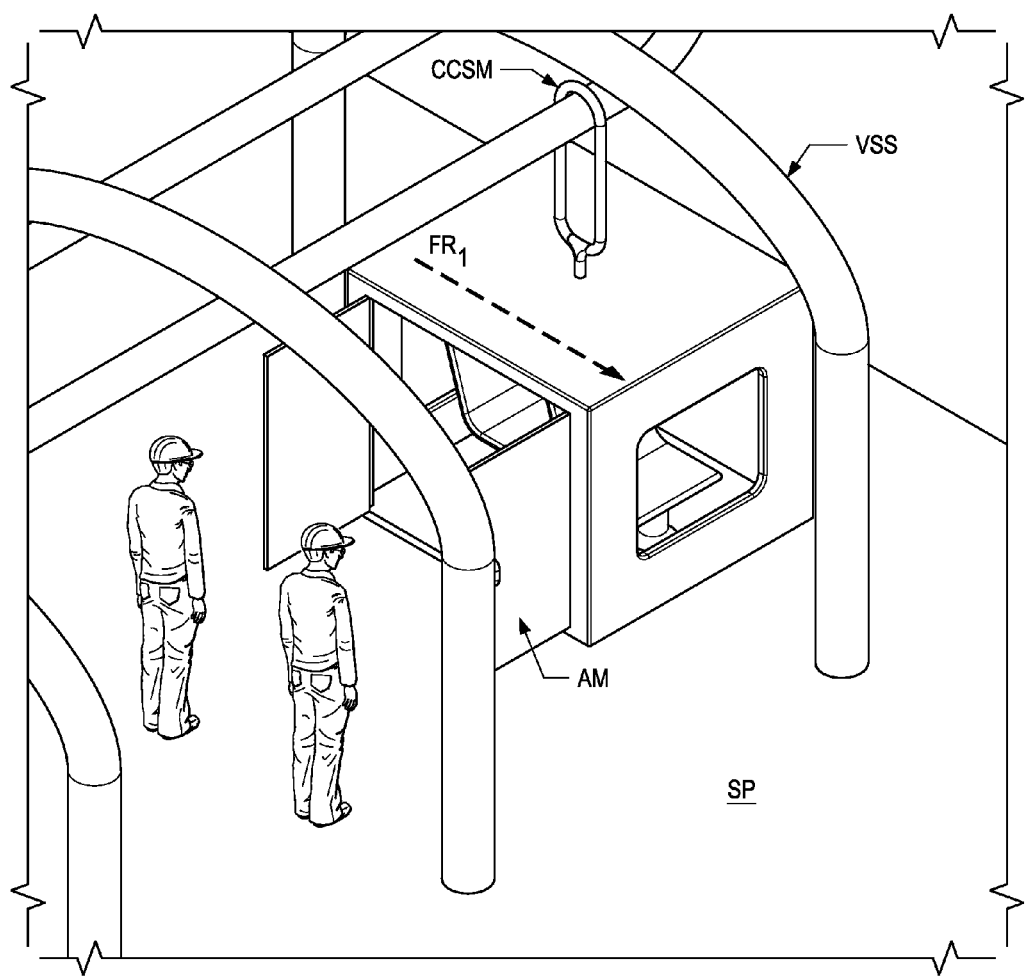
FIG. 11 illustrates a perspective three-dimensional view of the cargo compartment of FIG. 10 with its doors open for entry by human occupants.

FIG. 11 illustrates a perspective three-dimensional view of the compartment $CC_1$ of FIG. 10 with its access mechanism (e.g., doors) open for entry by human occupants. Thus, while the compartment $CC_1$ is positioned relative to, and slightly above, the stationary platform SP, and preferably while the compartment $CC_1$ is not moving, the occupants may step into the compartment, recognizing as mentioned above that the floor of the compartment is within a matter of inches of the upper surface of the stationary platform SP. In this manner, ingress to the compartment $CC_1$ is facilitated, as are comfort and appearances to the human passenger so as to reduce any possible trepidation in boarding. Indeed, also in the preferred embodiment the interior accommodations of the compartment $CC_1$ are comparable to existing modes of rail car (or automotive) interiors, so as to comfort the passenger and put them at ease in the present manner of transportation. Lastly in this regard, visibility to or of the overhead couplings of the compartment support mechanism CCSM may be minimized in actual implementation, so as to reduce the possibility of any concern that might arise in some persons from fear of vehicles such as overhead cable cars, or the like. Given the above, the accommodations of the preferred embodiment as illustrated in FIG. 11 allow the passengers to comfortably and safely board the compartment $CC_1$ and be seated in the seating CCS, thereby facing the window CCW. Note, therefore, that such forward facing direction is along the front-to-rear orientation axis $FR_1$, as introduced earlier in connection with FIG. 1. Moreover, the passengers so entering and seated in the compartment $CC_1$ are understood to have the intention of ultimately having the compartment, and hence its passengers, loaded to a transit (e.g., rail) system, consistent with the earlier discussion. The remaining FIGS. 12 through 16, therefore, illustrate the advancement of these passengers toward this goal.

Figure 12:
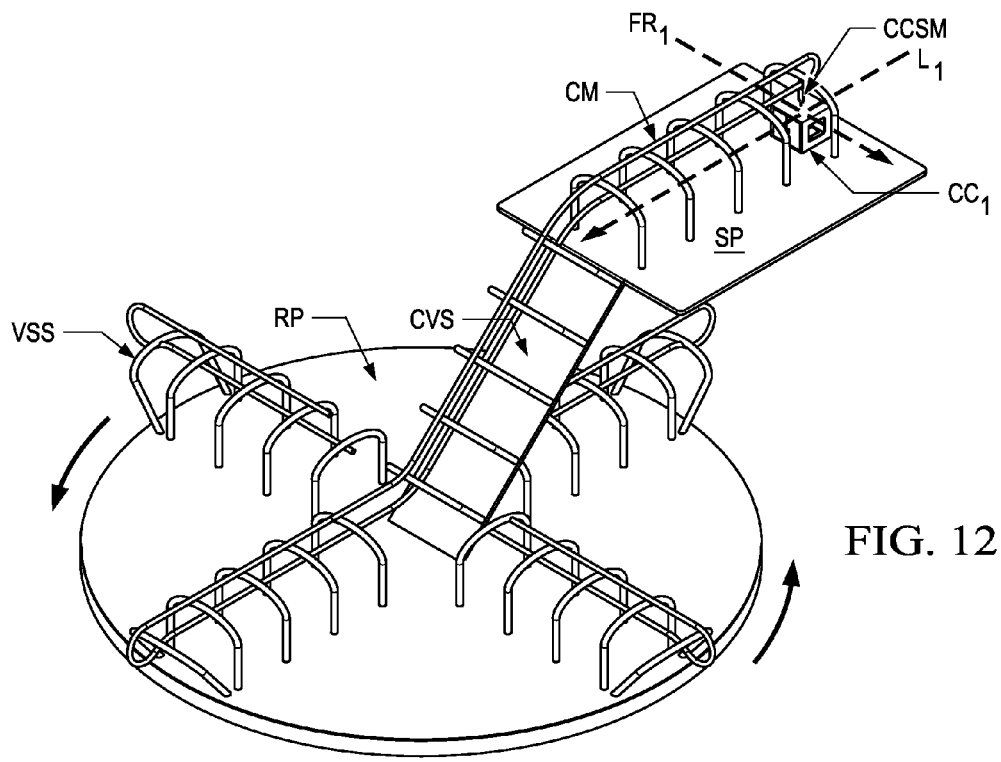
FIG. 12 illustrates a perspective three-dimensional view of a system including the cargo compartment of FIG. 10 located on a stationary platform and for overhead transport in a lateral direction.

FIG. 12 illustrates a perspective three-dimensional view of a system consistent with the teachings of earlier FIGS. 1 through 6, but with the aspects introduced now in connection with FIGS. 10 and 11. In FIG. 12, therefore, the compartment $CC_1$ of FIGS. 10 and 11 is supported above the stationary platform SP, with it presumed to have its passengers of FIG. 11 ready for transport in the lateral direction $L_1$. As detailed below, therefore, such transport is accomplished by movement of the compartment support mechanism CCSM, thereby contemporaneously moving the corresponding compartment $CC_1$, along the conveyor mechanism CM. Also in this regard, while the Figures illustrate the relationship of the compartment support mechanism CCSM as looping to a rail forming the conveyor mechanism CM, various alternatives may be implemented by one skilled in the art, with attention to engineering and human factors considerations.

Figure 13:
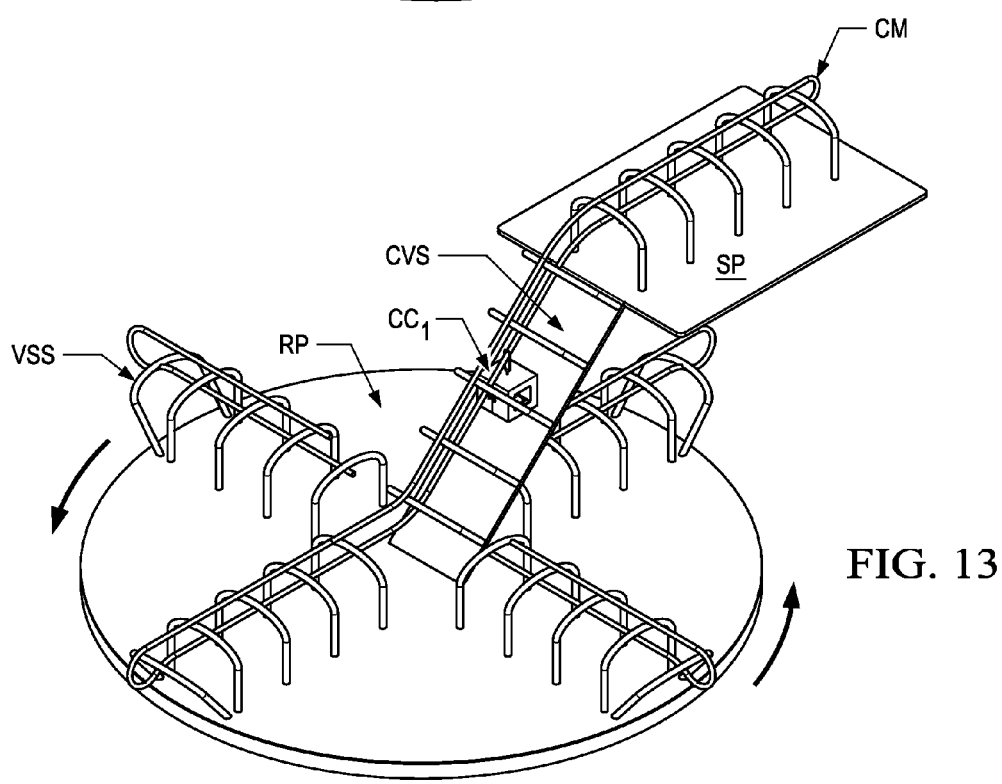
FIG. 13 illustrates a perspective three-dimensional view of the system of FIG. 12, wherein the overhead transport has advanced the cargo compartment laterally from the stationary platform and along the conveyor system.

FIG. 13 illustrates a perspective three-dimensional view of the system of FIG. 12, wherein the compartment support mechanism CCSM of the overhead conveyor mechanism CM has advanced the compartment $CC_1$ in the lateral direction $L_1$ from the stationary platform SP and along the conveyor system CVS. Note in the present embodiment that, due to the overhead transport nature of this approach, the conveyor system CVS is represented by a change in vertical (and preferably angled at less than 90 degrees relative to the horizontal) path of the compartment $CC_1$, without a full support from underneath the compartment $CC_1$ and therefore without any type of escalator-type mechanism or comparable below-the-structure support, in contrast to the embodiments of FIGS. 1 through 6. Moreover, in the approach of FIG. 13, the overhead transport system, and as described earlier in connection with a bottom-supporting system, continues to advance the compartment $CC_1$ laterally at the same speed to which it was accelerated relative to the stationary platform SP. Still further and as also mentioned with the earlier preferred embodiments, in the preferred embodiment of FIG. 13 (and others), the compartment $CC_1$ is maintained in a horizontal perspective while it descends along the conveyor system CVS.

Figure 14:
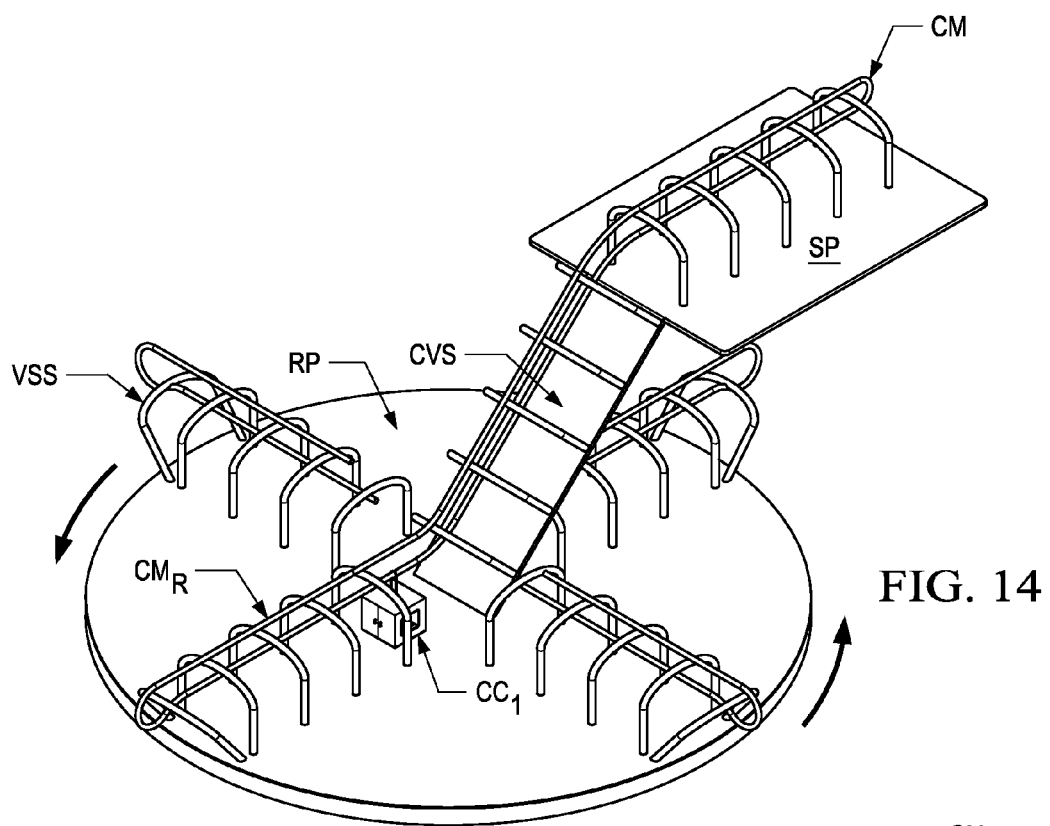
FIG. 14 illustrates a perspective three-dimensional view of the system of FIG. 13, wherein the overhead transport has advanced the cargo compartment laterally from the conveyor system and to an overhead transport aligned radially on the rotating platform.

FIG. 14 illustrates a perspective three-dimensional view of the system of FIG. 13, wherein the compartment support mechanism CCSM of the overhead conveyor mechanism CM has advanced the compartment $CC_1$ laterally, from the conveyor system CVS, to an overhead transport apparatus aligned radially on the rotating platform RP, again by locating the compartment $CC_1$ first in a center area of the rotating platform RP. The illustration of FIG. 14 (and others) generally illustrates a continuous path of the conveyor mechanism CM from the area of the stationary platform SP, to the area of the conveyor system CVS, to the center area (and beyond) of the rotating platform RP. One skilled in the art should recognize, however, that implementation of such a system may include couplings and interruptions to a continuous physical path; indeed, since the rotating platform RP is rotating, it is anticipated that additional couplings and accommodations are included as to facilitate the communication of the compartment $CC_1$, from what is a lateral path relative to the conveyor system, to what becomes a radial path along the rotating platform RP.

Once the compartment $CC_1$ is located in the center area of the rotating platform RP, then as described earlier the compartment $CC_1$ advances, now via the overhead transport, in a mechanically-guided, controlled, and orderly fashion, preferably along a radial direction. Due to the overhead transport nature of the present preferred embodiment approach, what was a track $T_x$ along a radius of the rotating platform RP in an earlier embodiment is achieved without a full support from underneath the compartment $CC_1$ in FIGS. 12 through 16 and, therefore, preferably without any type of below-the-structure support (or, only some minimal guidance, if desired). Thus, in the approach of FIG. 14 (and others), the overhead transport system, instead of a track $T_x$, continues to advance the compartment $CC_1$ in a manner that was laterally, and now is perceived as radially. Further, this advancement is again preferably at the same speed to which the compartment $CC_1$ was accelerated relative to the stationary platform SP and moved in alignment with the conveyor system CVS. To further illustrate this aspect, in FIG. 14 (and FIGS. 15 and 16), the portion of the conveyor mechanism CM of the overhead transport that extends radially with respect to the rotating platform is designated as $CM_R$. Lastly, just as the compartment $CC_1$ was described as within several inches of the stationary platform in connection with FIGS. 10 and 11, in the preferred embodiment this same vertical height is maintained relative to the rotating platform RP once the compartment $CC_1$ is communicated to the conveyor mechanism $CM_R$.

Figure 15:
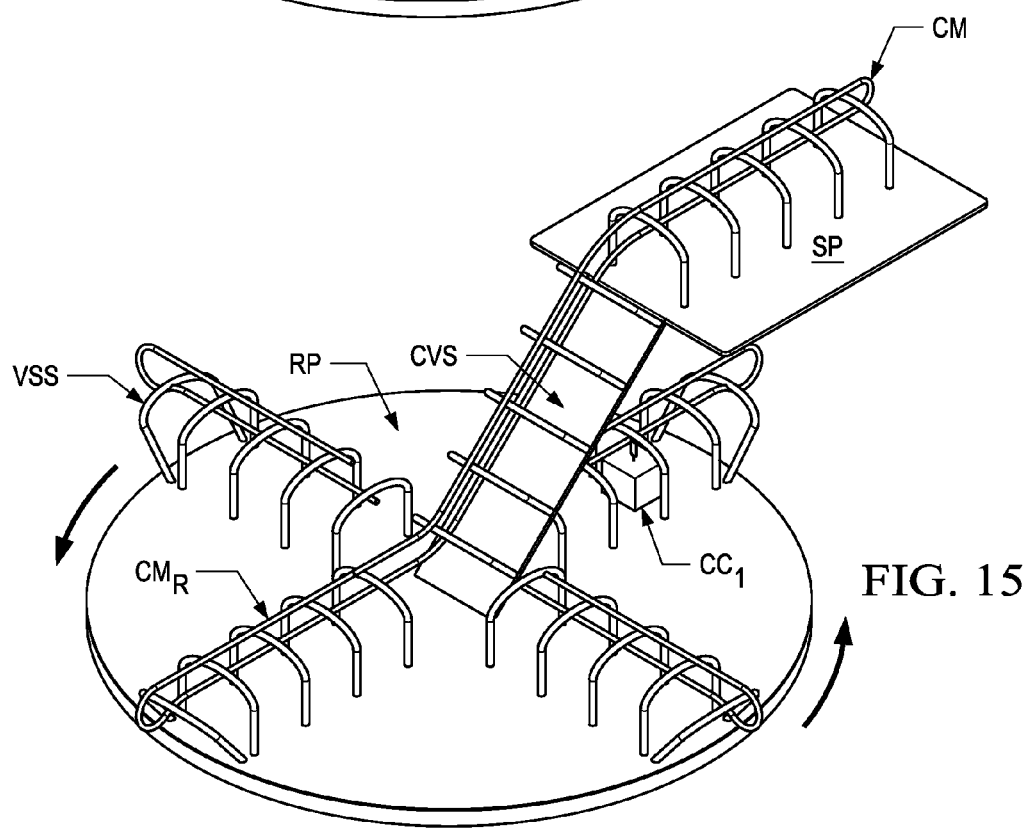
FIG. 15 illustrates a perspective three-dimensional view of the system of FIG. 14, wherein the overhead transport on the rotating platform has advanced the cargo compartment radially, while the rotating platform is rotating and thereby accelerating the compartment in a direction perpendicular to the radius of the rotating platform.

FIG. 15 illustrates a perspective three-dimensional view of the system of FIG. 14, wherein the conveyor mechanism $CM_R$ of the overhead transport, on the rotating platform RP, has advanced the compartment $CC_1$ radially, while the rotating platform RP is rotating. As with the earlier embodiments, therefore, at the same time as the compartment $CC_1$ moves radially, it accelerates in a direction perpendicular to the radius of the rotating platform RP. As also demonstrated earlier, therefore, the compartment passengers will experience only a modest constant speed laterally with little or no acceleration (i.e., change in speed) in that direction, while concurrently sensing an acceleration from near zero and then upward (e.g., to 50 mph) in their front-to-rear orientation axis $FR_1$.

Figure 16:
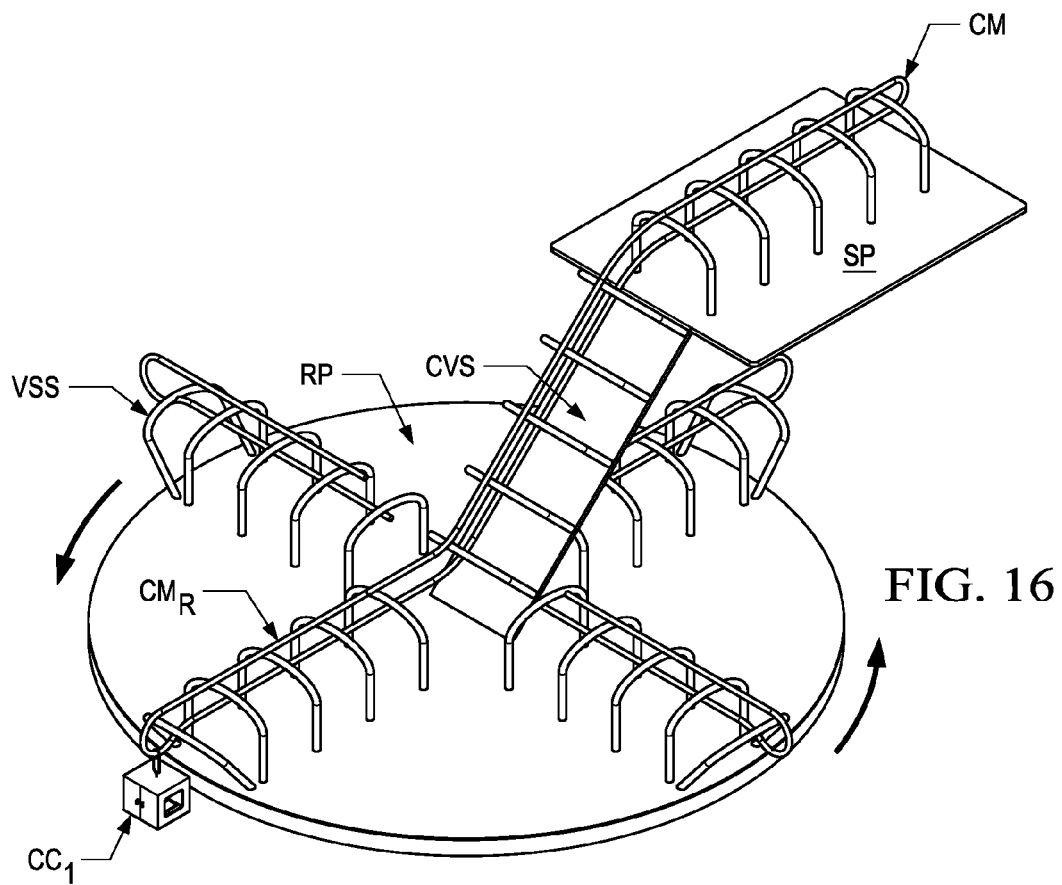
FIG. 16 illustrates a perspective three-dimensional view of the system of FIG. 15, wherein the overhead transport on the rotating platform has continued to advance the cargo compartment radially, while the rotating platform is rotating, to a position beyond the perimeter of the rotating platform.
Figure 17:
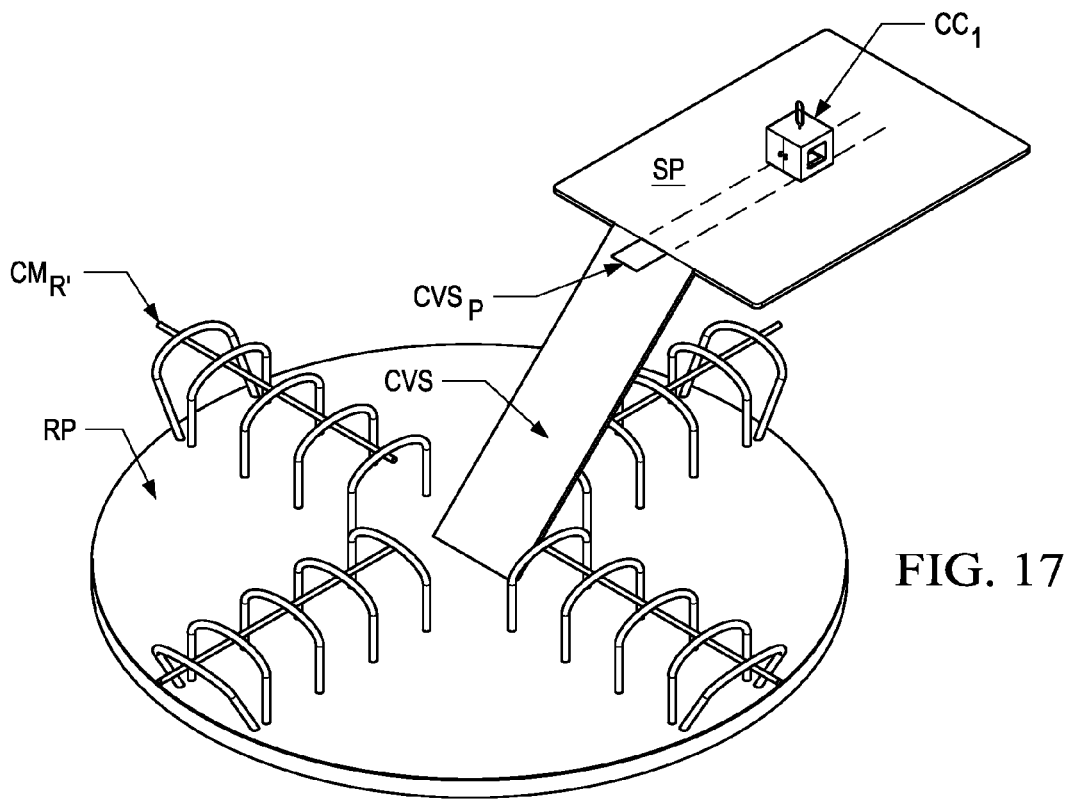
FIG. 17 illustrates a perspective three-dimensional view of an alternative system including a below-the-cargo-compartment mechanism for advancing the cargo compartment on the stationary platform and to the center area of the rotating platform in combination with an above-the-cargo-compartment mechanism for advancing the cargo compartment from the center area of the rotating platform to the perimeter of the rotating platform.
Figure 18:
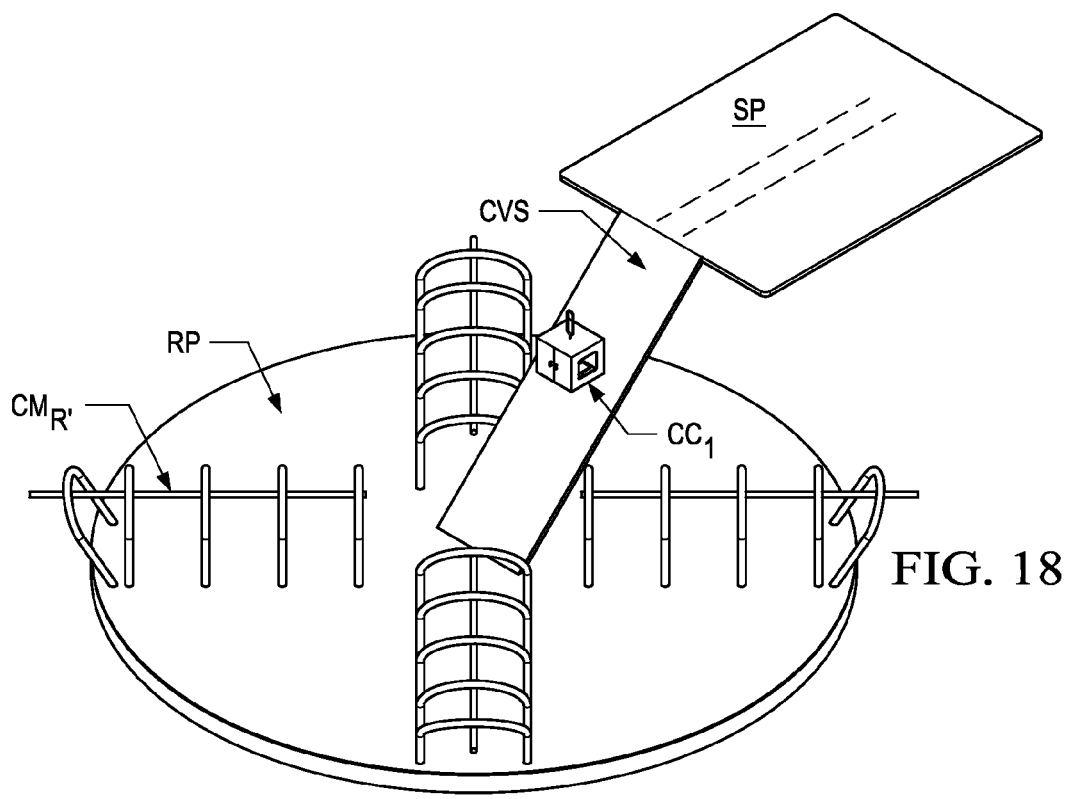
FIG. 18 illustrates the system of FIG. 17 as the cargo compartment descends down the conveyor system.
Figure 19:
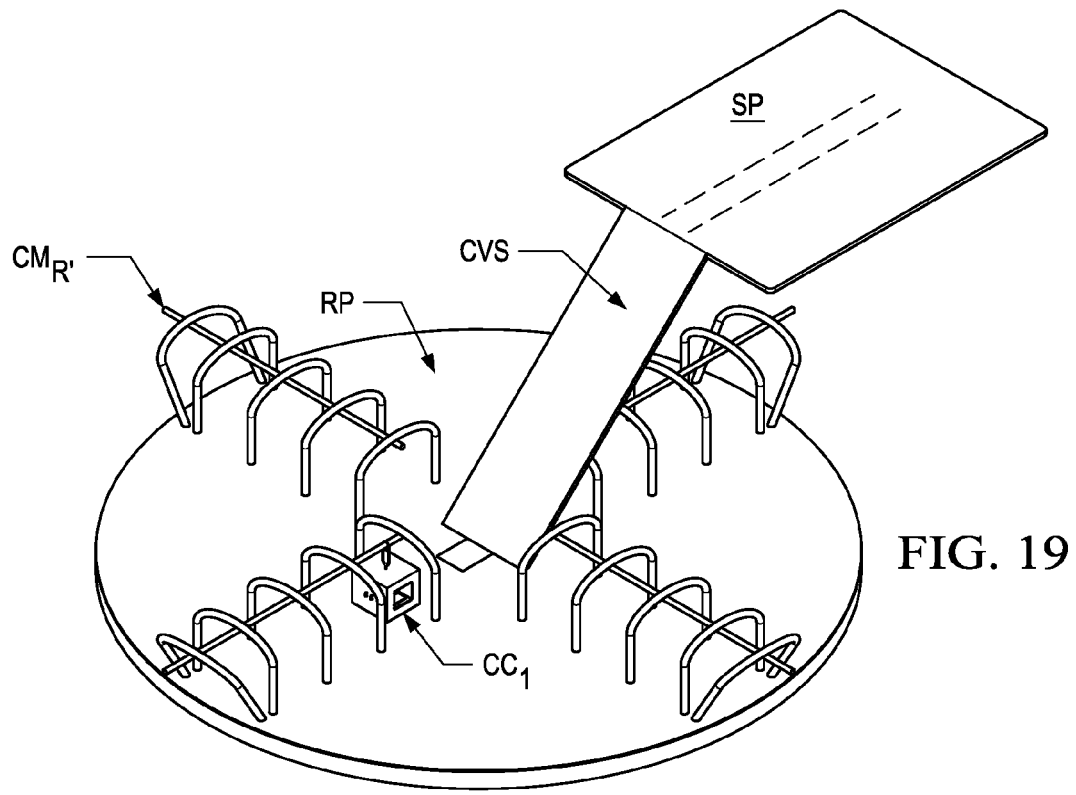
FIG. 19 illustrates the system of FIG. 18 as the cargo compartment leaves the center area of the rotating platform and along a radial path.
Figure 20:
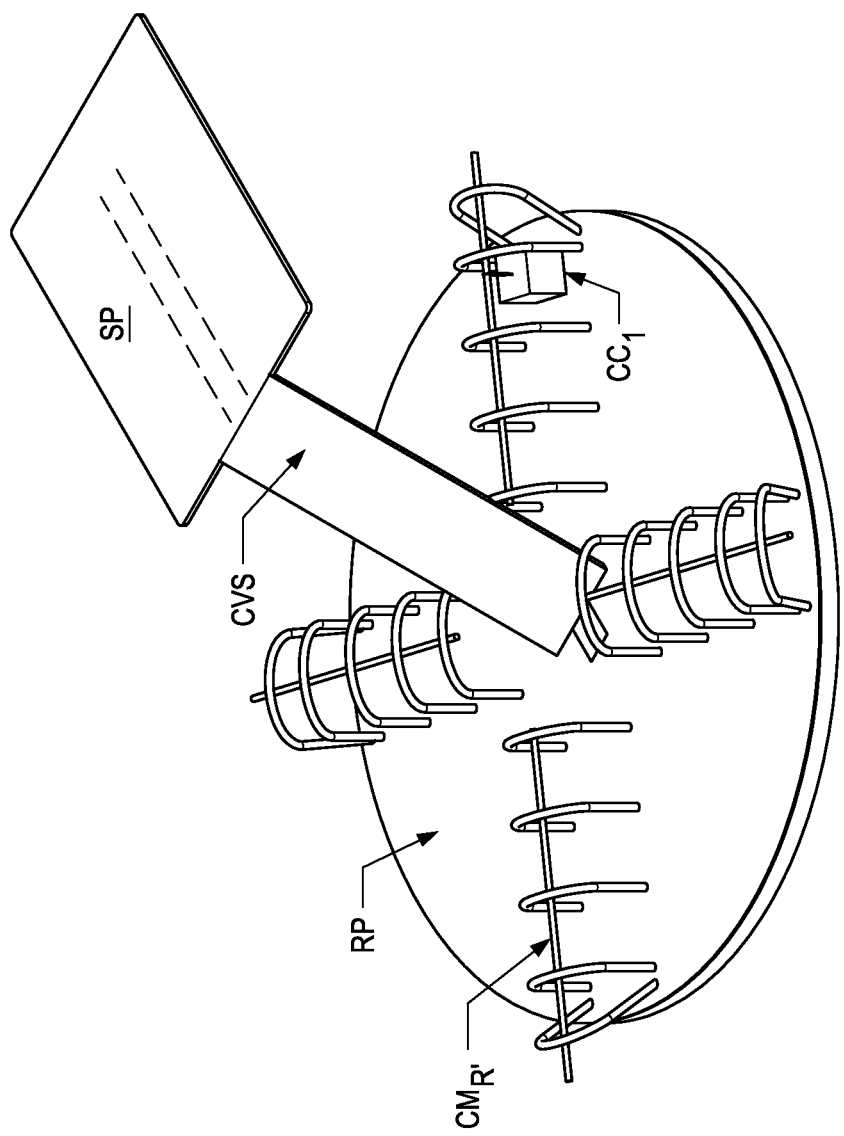
FIG. 20 illustrates the system of FIG. 19 as the cargo compartment continues along the radial path, while the rotating platform is rotating.
Figure 20:
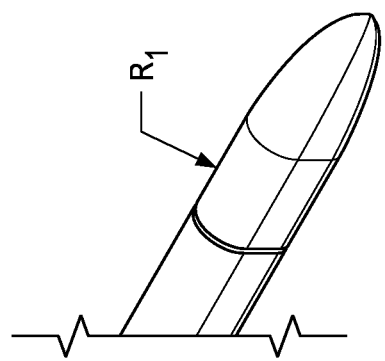
Figure 21:
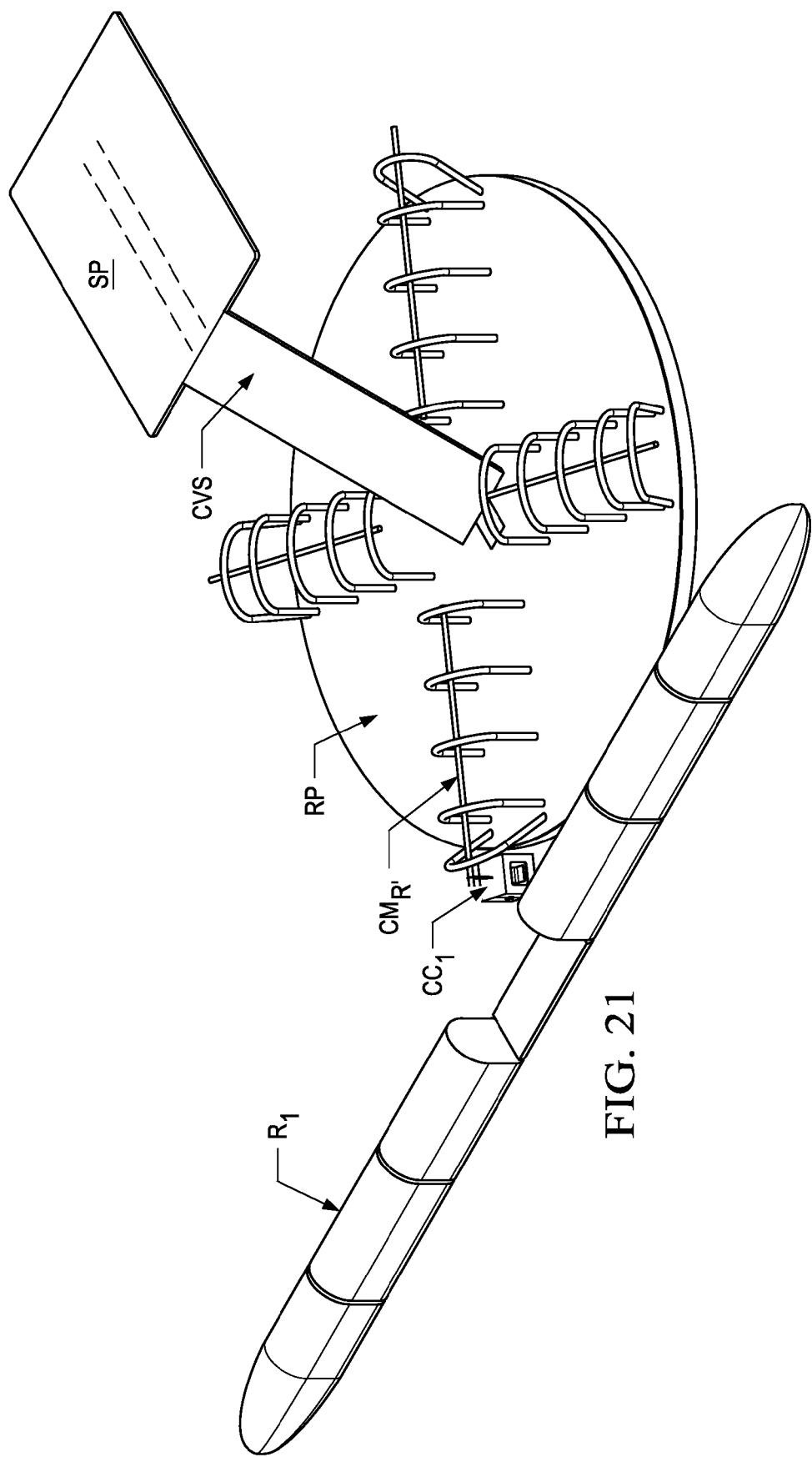
FIG. 21 illustrates the system of FIG. 20 as the cargo compartment continues still farther along the radial path, while the rotating platform is rotating and a railcar is approaching, and in preparation of delivering the cargo compartment from the end of the radial path onto the railcar.
Figure 22:
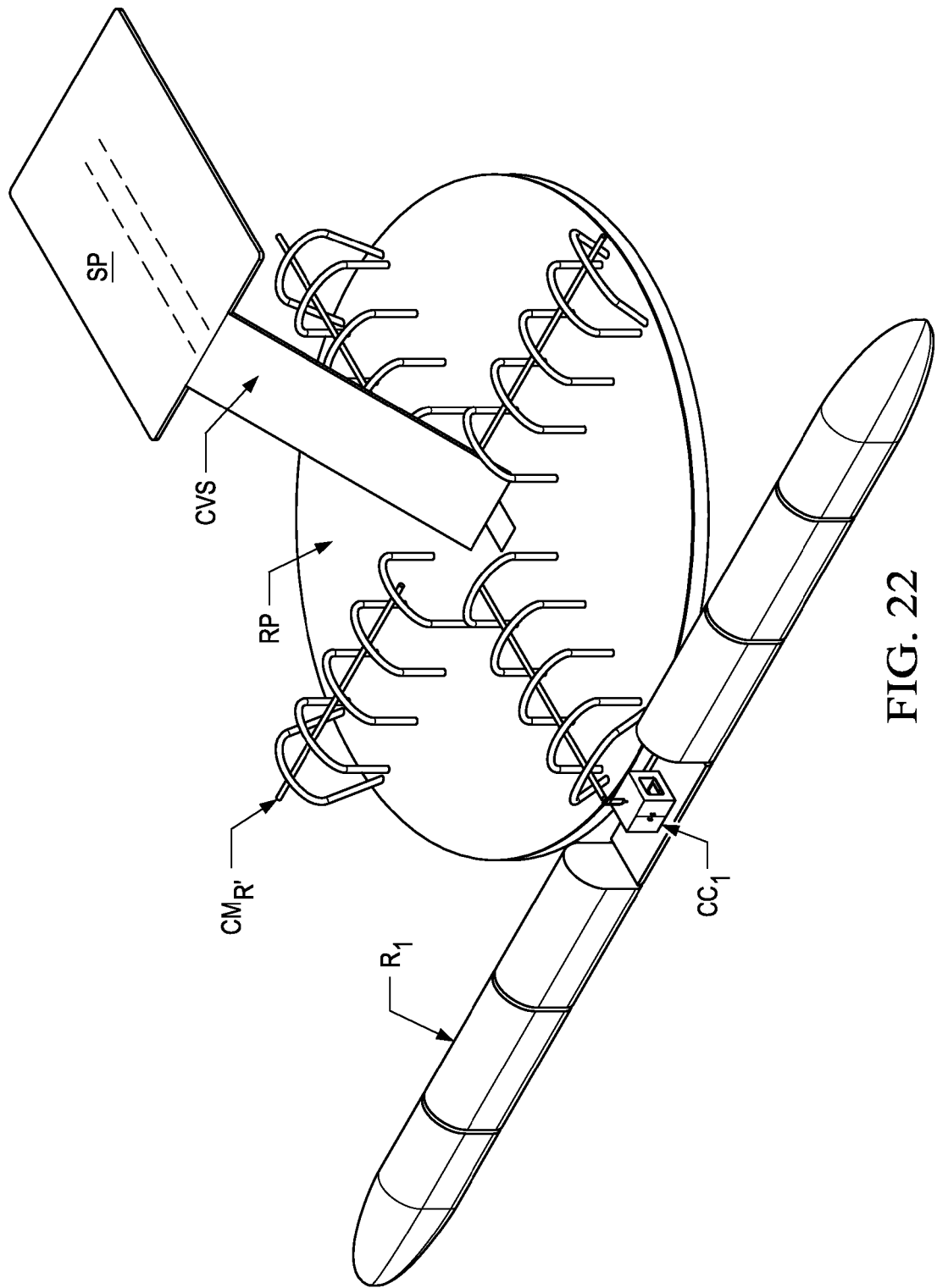
FIG. 22 illustrates the system of FIG. 21 as the cargo compartment is delivered to the railcar, while the rotating platform is rotating and the railcar continues to move.
Figure 23:
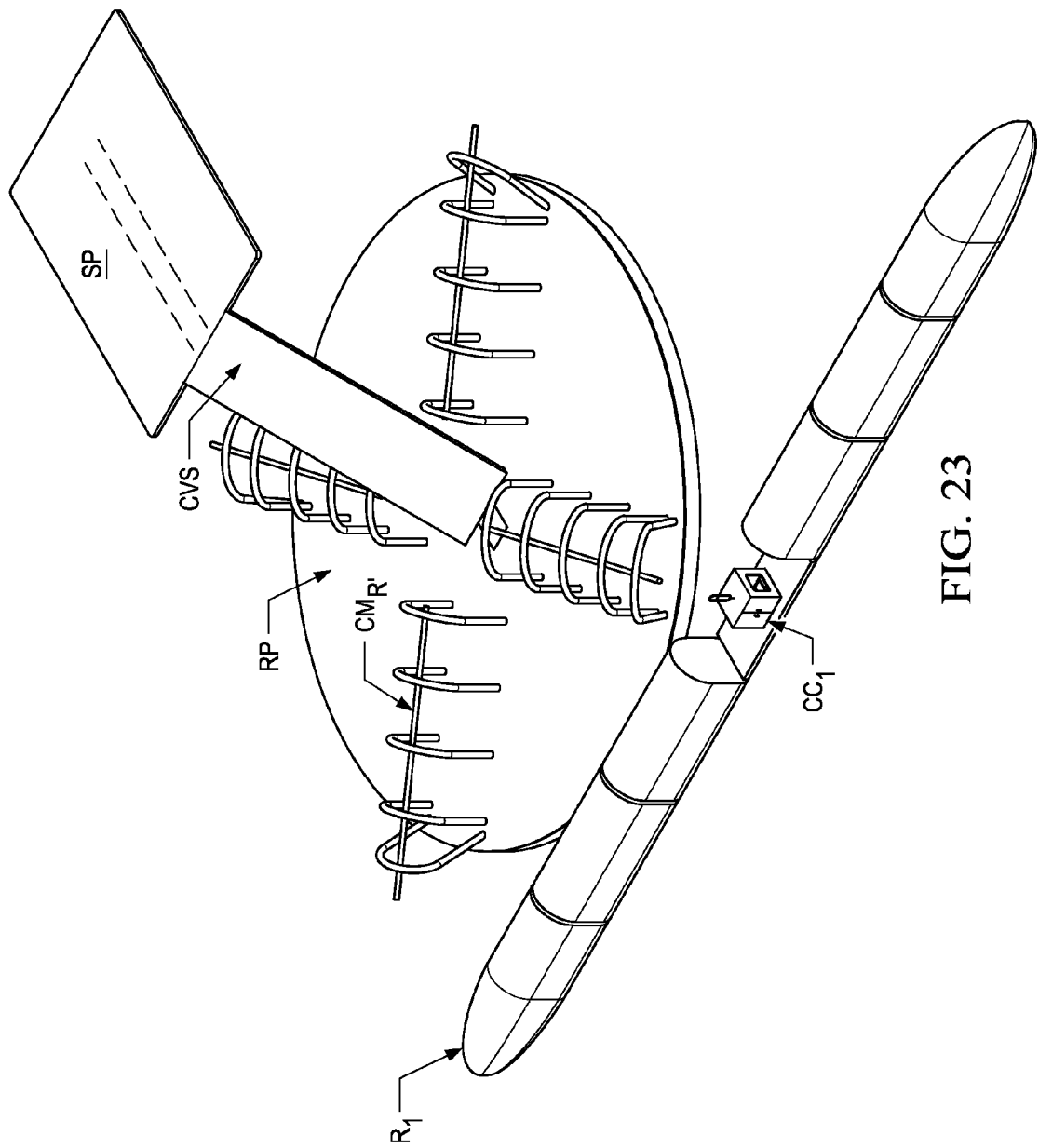
FIG. 23 illustrates the system of FIG. 22 once the cargo compartment is delivered to the railcar, and the rotating platform continues to rotate.

FIG. 16 illustrates a perspective three-dimensional view of the system of FIG. 15, wherein the conveyor mechanism $CM_R$ of the overhead transport on the rotating platform RP has continued to advance the compartment radially, while the rotating platform RP is rotating, to a position beyond the perimeter of the rotating platform RP. In this regard, note also that the preferred embodiment overhead transport includes apparatus that extend beyond the perimeter of the rotating platform RP; in the illustrated embodiment, such apparatus is achieved by extending the overhead conveyor mechanism $CM_R$ beyond the platform perimeter, such as by having the last arch in the series of radial arches leaning in a non-vertical fashion, away from the rotating platform, as may be achieved using a cantilevered structure or methodology. With such an attribute, and as shown in FIG. 16, the compartment $CC_1$ is still mechanically coupled relative to the rotating platform RP and the transport system, while being able to extend beyond the platform perimeter and also being readied for release to an accompanying and corresponding rail car, which is not shown in FIG. 16 but may cooperate with the system in the same general way as described earlier in connection with FIGS. 1 through 6. With the lateral extension of the conveyor mechanism $CM_R$ beyond the rotating platform perimeter, however, the compartment $CC_1$ may be released in a more vertical fashion, thereby requiring a less complicated, and potentially more comforting and safely-implemented, manner of transmission of the compartment from the rotating system to the rail car. Lastly, note that the conveyor mechanism $CM_R$ may include apparatus, such as a pivoting mechanism or a curve in the path of the conveyor mechanism $CM_R$, to permit small rotational changes (e.g., less than 10 degrees) to the orientation of the compartment $CC_1$, such as when releasing the compartment $CC_1$ to the rail car so as to accommodate the difference in angular movement from the rotating platform perimeter to the linear movement of the rail car, and potentially also to facilitate the handoff of the compartment $CC_1$ from the conveyor mechanism CM portion associated with the conveyor system CVS to the conveyor mechanism $CM_R$ portion associated with the rotating platform RP.

Given the above discussion of FIGS. 10 through 16, one skilled in the art will appreciate that they too provide a mass transit system with both a stationary platform SP and a rotating platform RP, with a conveyor system CVS/CM/$CM_R$ for moving a cargo compartment $CC_1$ between them. Moreover, with the conveyor system being an overhead type system relative to the compartment, it may continue in segments along the rotating platform to more the cargo compartment $CC_1$ from the center area of the rotating platform RP to a point relative to, and even beyond, the perimeter of the rotating platform RP. Still further, note that by maintaining the compartment $CC_1$ within inches of the rotating platform RP surface, if the system requires a cessation, then the motion of the compartment $CC_1$ also ceases and the occupants can exit the compartment and walk along the stopped rotating platform RP to a point of egress, such as a stairwell (not shown) near its center area.

FIGS. 17 through 23 illustrate a perspective three-dimensional view of an alternative system according to a preferred embodiment. The system of FIGS. 17 through 23 is comparable in numerous respects to the system of FIGS. 1 through 6 and also in other respects to that of FIGS. 10 through 16. The details provided with respect to those systems have been described above, and for sake of simplifying the document are not repeated here. Instead, therefore, only a few matters of commonality of the systems are noted. First, the FIG. 17 system includes a below-the-cargo-compartment mechanism for advancing the cargo compartment on the stationary platform SP and, via a platform $CVS_P$ of the conveyor system CVS, to the center area of the rotating platform RP; in this regard, therefore, the FIG. 17 system is akin to the system of FIGS. 1 through 6. Second, the system of FIGS. 17 through 23 includes an above-the-cargo-compartment mechanism for advancing the cargo compartment from the center area of the rotating platform RP to the perimeter of the rotating platform RP; in this regard, therefore, the system of FIGS. 17 through 23 is akin to the system of FIGS. 10 through 16. Certain additional benefits are therefore achieved. For example, as passengers load into a cargo compartment on the stationary platform SP, there is no concern with any overhead control as might attract the attention of certain people. In addition, the underlying support of the cargo compartment on both the stationary platform SP and the conveyor system CVS also may provide a very stable sense of support and movement. As another benefit, however, the overhead system along the rotating platform RP may more simply, efficiently, and safely facilitate the handoff of a cargo compartment to a railcar.

Note also with respect to the system of FIGS. 17 through 23 that the above-the-cargo-compartment mechanism is shown as a conveyor mechanism $CM_R'$, comparable in some respects to the conveyor mechanism $CM_R$ described above. In contrast to that above-described conveyor mechanism $CM_R$, however, note in FIGS. 10 through 16 that the conveyor mechanism $CM_R$ illustrates a loop, whereby the overhead carrier mechanism, for coupling to the top of the cargo compartment and transporting it radially from the rotating platform center area outward, can continue its path so as to return along the loop toward the center area of the rotating platform RP after the cargo compartment is released. In contrast, in the system of FIGS. 17 through 23, the conveyor mechanism $CM_R'$ forms a two-way non-looping (e.g., linear) path, so that the overhead carrier (not expressly shown) travels from the rotating platform center area outward to carry a cargo compartment outward, and then returns along the same path back toward the center area. The return path, therefore, allows the carrier to await a next cargo compartment. Moreover, as mentioned earlier, in a preferred embodiment the system also may move a cargo compartment from the rotating platform perimeter toward the rotating platform center area, such as when removing such a compartment from a rail car. In this regard, therefore, the carrier may move the cargo compartment radially inward along the two-way path provided by the conveyor mechanism $CM_R'$.

Given the preceding, the preferred embodiments provide an improved mass transit facilitation system and method. These embodiments provide numerous benefits over current manners of cargo loading schemes, and may have profound impact on the transportation of human passengers. As one benefit, passengers may be moved in an orderly fashion from a stationary location to a moving rail car, without requiring the rail car to stop, or in some instances without it having to slow its speed—such an approach may have considerable reduction on energy and other resource consumption. Numerous other benefits have been described, and still others will be appreciated by one skilled in the art. Further, while the inventive scope has been demonstrated by certain preferred embodiments, one skilled in the art will appreciate that it is further subject to various modifications, substitutions, or alterations, without departing from that inventive scope. For example, while certain dimensions and shapes have been provided, alternatives may be selected. As another example and furthering concepts shown earlier, one or more rotating platforms may be used to service a line, with plural platforms providing either loading, unloading, or both functions. As another example, while the preferred embodiment includes a descent of a compartment cargo to a rotating platform, another approach may operate to cause an ascent of a compartment cargo to a rotating platform. Still another example is that while travel of the compartment cargo has been described to include a lateral direction along the stationary platform SP and the conveyor system CVS, and a lateral direction of movement with a front-to-rear acceleration on the rotating platform RP, such directionalities may be altered in some preferred embodiments. Thus, the inventive scope is demonstrated by the teachings herein and is further guided by the following exemplary but non-exhaustive claims.

What is claimed is:

1. A method of accelerating an item with a rotating platform having a center point, a perimeter, and a radius from the center point to the perimeter, the method comprising:
   delivering the item to a center area of the rotating platform by delivering the item to a first radial distance on the rotating platform, wherein the item has a first speed at the center area and tangential to the first radial distance;
   while the rotating platform is rotating, moving the item, in an apparatus-controlled mechanically guided, nonrandom orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed; and
   while the rotating platform is rotating, moving the item, from the point, to a location beyond the perimeter of the rotating platform.

2. The method of claim 1 wherein the step of moving the item, from the point, to a location beyond the perimeter of the rotating platform, comprises moving the item to a moving system that is moving independent of the rotating platform.

3. The method of claim 2 wherein the moving system is moving at a speed approximately equal to the second speed.

4. The method of claim 1 wherein the step of moving the item, in an apparatus-controlled orderly path, comprises moving the item in a linear radial path from the center area to the point relative to the rotating platform that is adjacent the perimeter of the rotating platform.

5. The method of claim 1 wherein the first radial distance on the rotating platform is no greater than 20 percent of the radius of the rotating platform.

6. The method of claim 1 wherein the first radial distance on the rotating platform is no greater than 10 percent of the radius of the rotating platform.

7. The method of claim 1 wherein the step of moving the item, in an apparatus-controlled orderly path, comprises moving the item at a constant speed from the center area to the point relative to the rotating platform that is adjacent the perimeter of the rotating platform.

8. The method of claim 1 and further comprising, moving the item, from the point, to the center area.

9. The method of claim 1 wherein the step of moving the item, in an apparatus-controlled orderly path, comprises maintaining a front-to-rear orientation of the item in a direction tangential to the radius of the rotating platform from the center area to the point relative to the rotating platform that is adjacent the perimeter of the rotating platform.

10. The method of claim 1 wherein the item comprises a cargo compartment.

11. The method of claim 10 wherein the cargo compartment is for carrying goods.

12. The method of claim 10 wherein the cargo compartment is for carrying humans.

13. The method of claim 1 wherein the step of moving the item, from the point, to a location beyond the perimeter of the rotating platform, comprises moving the item to a transport system.

14. The method of claim 13 wherein the transport system comprises a railcar.

15. The method of claim 1 wherein the step of moving in an apparatus-controlled orderly path comprises moving with an apparatus independent of a surface of the rotating platform.

16. The method of claim 1 wherein the step of moving the item, from the point, to a location beyond the perimeter of the rotating platform, comprises moving the item in an apparatus-controlled orderly path, from the point, to a location beyond the perimeter of the rotating platform.

17. The method of claim 1 wherein the step of moving the item, in an apparatus-controlled orderly path, comprises maintaining a fixed orientation of the item relative to the radius of the rotating platform while moving the item from the center area to a point relative to the rotating platform that is adjacent a perimeter of the rotating platform.

18. A system for accelerating an item, comprising:
   a rotating platform having a center point, a perimeter, and a radius from the center point to the perimeter;
   apparatus for delivering the item to a center area of the rotating platform by delivering the item to a first radial distance on the rotating platform, wherein the item has a first speed at the center area and tangential to the first radial distance;
   apparatus for moving the item, in an apparatus-controlled mechanically guided, nonrandom orderly path and while the rotating platform is rotating, from the center area to a point relative to the rotating platform that is adjacent a perimeter of the rotating platform and that is located at a second radial distance greater than the first radial distance, wherein the item has a second speed tangential to the second radial distance and the second speed is greater than the first speed; and apparatus for moving the item, from the point and while the rotating platform is rotating, to a location beyond the perimeter of the rotating platform.

19. The system of claim 18 wherein the apparatus for moving the item, from the point, to a location beyond the perimeter of the rotating platform, comprises apparatus for moving the item to a moving system that is moving independent of the rotating platform.

20. The system of claim 18 wherein the apparatus for moving the item, in an apparatus-controlled orderly path, comprises apparatus for moving the item in a linear radial path from the center area to the point relative to the rotating platform that is adjacent the perimeter of the rotating platform.

21. The system of claim 18 wherein the first radial distance on the rotating platform is no greater than 20 percent of the radius of the rotating platform.

22. The system of claim 18 wherein the first radial distance on the rotating platform is no greater than 10 percent of the radius of the rotating platform.

23. The system of claim 18 wherein the apparatus for moving the item is independent of a surface of the rotating platform.

24. The system of claim 18 wherein the apparatus for moving the item, from the point to the location beyond the perimeter of the rotating platform, comprises apparatus for moving the item in an apparatus-controlled orderly path.

25. The system claim 18 wherein the apparatus for moving the item, in an apparatus-controlled orderly path, comprises apparatus for maintaining a front-to-rear orientation of the item in a direction tangential to the radius of the rotating platform.

26. The system claim 18 wherein the apparatus for moving the item, in an apparatus-controlled orderly path, comprises apparatus for maintaining a fixed orientation of the item relative to the radius of the rotating platform while moving the item from the center area to a point relative to the rotating platform that is adjacent a perimeter of the rotating platform.

27. A method of accelerating an item with a rotating platform having a center point, a perimeter, and a radius from the center point to the perimeter, the method comprising:

delivering the item to a center area of the rotating platform by delivering the item to a first radial distance on the rotating platform, wherein the item has a first speed at the center area and tangential to the first radial distance;

while the rotating platform is rotating, moving the item, in an apparatus-controlled orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed and wherein the apparatus-controlled orderly path comprises a fixed path between the center area to a point relative to the rotating platform that is adjacent a perimeter of the rotating platform; and while the rotating platform is rotating, moving the item, from the point, to a location beyond the perimeter of the rotating platform.

28. A system for accelerating an item, comprising:

a rotating platform having a center point, a perimeter, and a radius from the center point to the perimeter;

apparatus for delivering the item to a center area of the rotating platform by delivering the item to a first radial distance on the rotating platform, wherein the item has a first speed at the center area and tangential to the first radial distance;

apparatus for moving the item, in an apparatus-controlled orderly path and while the rotating platform is rotating, from the center area to a point relative to the rotating platform that is adjacent a perimeter of the rotating platform and that is located at a second radial distance greater than the first radial distance, wherein the item has a second speed tangential to the second radial distance and the second speed is greater than the first speed, wherein the apparatus for moving the item, in a controlled orderly path comprises apparatus for moving the item in a fixed path between the center area to a point relative to the rotating platform that is adjacent a perimeter of the rotating platform; and apparatus for moving the item, from the point and while the rotating platform is rotating, to a location beyond the perimeter of the rotating platform.

* * * * *